US012676986B2

(12) United States Patent
Choi et al.

(10) Patent No.: US 12,676,986 B2
(45) Date of Patent: Jul. 7, 2026

(54) IMAGE ENCODING/DECODING METHOD AND APPARATUS FOR PERFORMING REFERENCE SAMPLE FILTERING ON BASIS OF INTRA PREDICTION MODE, AND METHOD FOR TRANSMITTING BITSTREAM

(71) Applicant: LG Electronics Inc., Seoul (KR)

(72) Inventors: Jangwon Choi, Seoul (KR); Jaehyun Lim, Seoul (KR); Nae Ri Park, Seoul (KR); Sunmi Yoo, Seoul (KR); Jung Hak Nam, Seoul (KR); Hyeong Moon Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/293,202

(22) PCT Filed: Aug. 18, 2022

(86) PCT No.: PCT/KR2022/012317
§ 371 (c)(1),
(2) Date: Jan. 29, 2024

(87) PCT Pub. No.: WO2023/022530
PCT Pub. Date: Feb. 23, 2023

(65) Prior Publication Data
US 2025/0080754 A1      Mar. 6, 2025

(30) Foreign Application Priority Data
Aug. 18, 2021      (KR) ........................ 10-2021-0108572

(51) Int. Cl.
*H04N 19/105*          (2014.01)
*H04N 19/117*          (2014.01)
(Continued)

(52) U.S. Cl.
CPC ......... *H04N 19/159* (2014.11); *H04N 19/105* (2014.11); *H04N 19/117* (2014.11); *H04N 19/176* (2014.11)

(58) Field of Classification Search
CPC ........................... H04N 19/159; H04N 19/105
See application file for complete search history.

(56) References Cited

U.S. PATENT DOCUMENTS 10,021,403 B2 * 7/2018 Kolesnikov .......... H04N 19/176
12,425,610 B2 * 9/2025 Yan ...................... H04N 19/105
(Continued)

FOREIGN PATENT DOCUMENTS

EP          3522538 A1      8/2019
JP      2015-181254 A      10/2015
(Continued)

OTHER PUBLICATIONS

Office Action in Japanese Appln. No. 2024-506215, mailed on Jan. 21, 2025, 7 pages (with English translation).
(Continued)

*Primary Examiner* — Irfan Habib
(74) *Attorney, Agent, or Firm* — Fish & Richardson P.C.

(57)          ABSTRACT

Provided are an image encoding/decoding method and apparatus. An image decoding method performed by an image decoding apparatus may comprise determining an intra prediction mode of a current block, performing planar intra prediction based on the intra prediction mode being a planar prediction mode and obtaining a reconstructed sample of the current block based on a prediction sample obtained based on the planar intra prediction. The performing the planar intra prediction may comprise applying filtering to an intra prediction reference sample of the current block.

14 Claims, 23 Drawing Sheets

(51) Int. Cl.
    *H04N 19/159*        (2014.01)
    *H04N 19/176*        (2014.01)

(56)            References Cited

U.S. PATENT DOCUMENTS

| | | | |
|---|---|---|---|
| 2006/0280372 A1* | 12/2006 | Han | H04N 19/117 |
| | | | 382/268 |
| 2011/0255591 A1* | 10/2011 | Kim | H04N 19/61 |
| | | | 375/E7.243 |
| 2011/0280304 A1* | 11/2011 | Jeon | H04N 19/176 |
| | | | 375/E7.243 |
| 2011/0293001 A1* | 12/2011 | Lim | H04N 19/80 |
| | | | 375/E7.243 |
| 2012/0082224 A1* | 4/2012 | Van Der Auwera | H04N 19/46 |
| | | | 375/E7.243 |
| 2012/0114048 A1* | 5/2012 | Sole | H04N 19/117 |
| | | | 375/E7.193 |
| 2012/0147955 A1* | 6/2012 | Budagavi | H04N 19/159 |
| | | | 375/E7.243 |
| 2012/0195378 A1* | 8/2012 | Zheng | H04N 19/105 |
| | | | 375/E7.243 |
| 2013/0129237 A1* | 5/2013 | Yie | H04N 19/44 |
| | | | 382/233 |
| 2015/0023405 A1* | 1/2015 | Joshi | H04N 19/117 |
| | | | 375/240.02 |
| 2016/0373743 A1* | 12/2016 | Zhao | H04N 19/174 |
| 2017/0034536 A1* | 2/2017 | Filippov | H04N 19/117 |
| 2017/0150180 A1* | 5/2017 | Lin | H04N 19/59 |
| 2018/0091825 A1* | 3/2018 | Zhao | H04N 19/117 |
| 2018/0098004 A1* | 4/2018 | Korneliussen | G06T 5/50 |
| 2018/0324417 A1* | 11/2018 | Karczewicz | H04N 19/159 |
| 2019/0007688 A1* | 1/2019 | Zhang | H04N 19/159 |
| 2019/0110052 A1* | 4/2019 | Liu | H04N 19/105 |
| 2019/0158827 A1* | 5/2019 | Sim | H04N 19/11 |
| 2020/0021828 A1* | 1/2020 | Cho | H04N 19/176 |
| 2020/0322623 A1* | 10/2020 | Chiang | H04N 19/46 |
| 2020/0413072 A1* | 12/2020 | Filippov | H04N 19/119 |
| 2021/0006828 A1 | 1/2021 | Jeon et al. | |
| 2021/0127122 A1* | 4/2021 | Filippov | H04N 19/80 |
| 2021/0160491 A1* | 5/2021 | Filippov | H04N 19/176 |
| 2021/0377519 A1* | 12/2021 | Kim | H04N 19/105 |
| 2022/0086426 A1* | 3/2022 | Lee | H04N 19/132 |
| 2024/0283943 A1* | 8/2024 | Jeon | H04N 19/00 |
| 2025/0016308 A1* | 1/2025 | Yan | H04N 19/82 |

FOREIGN PATENT DOCUMENTS

| | | |
|---|---|---|
| JP | 2016-072941 A | 5/2016 |
| JP | 2017-508324 A | 3/2017 |
| JP | 2022-513174 A | 2/2022 |
| JP | 2022-515814 A | 2/2022 |
| JP | 2022-517666 A | 3/2022 |
| JP | 2022-529432 A | 6/2022 |
| KR | 10-1468078 | 12/2014 |
| KR | 10-2016-0082250 | 7/2016 |
| KR | 10-1855293 | 6/2018 |
| KR | 10-2020-0005480 | 1/2020 |
| KR | 10-2020-0145748 | 12/2020 |
| WO | 2020/257842 A1 | 12/2020 |
| WO | 2021/043138 A1 | 3/2021 |

OTHER PUBLICATIONS

Alshina, "EE1 (Tests 8 and 9) Performance of ARSS and PDPC in presence of other tools," JVET-G0113-r1, Joint Video Exploration Team (JVET) of ITU-T SG 16 WP 3 and ISO/IEC JTC 1/SC 29/WG 11, 7th Meeting: Torino, Italy, Jul. 13-21, 2017, 3 pages.

Extended European Search Report in European Appln. No. 22858767. 1, mailed on Jun. 30, 2025, 12 pages.

Kim et al., "Improvement of intra prediction with multiple modes for Internet Video Coding," International Organisation For Standardisation, Organisation Internationale De Normalisation, ISO/IEC JTC1/ SC29/WG11 Coding Of Moving Pictures and Audio, ISO/IEC JTC1/SC29/WG11 MPEG2013/M31516, Geneva, Switzerland, Oct. 2013, 5 pages.

Notice of Allowance in Japanese Appln. No. 2024-506215, mailed on Sep. 2, 2025, 4 pages (with English translation).

* cited by examiner

FIG. 1

SPLIT_BT_VER        SPLIT_BT_HOR        SPLIT_TT_VER        SPLIT_TT_HOR

START

S610

PERFORM PREDICTION (DETERMINE
INTRA PREDICTION MODE/TYPE, DERIVE
NEIGHBORING REFERENCE SAMPLES,
AND GENERATE PREDICTION SAMPLES)

S620

RESIDUAL PROCESSING (DERIVE RESIDUAL
SAMPLES ON BASIS OF PREDICTION SAMPLES)

S630

ENCODE IMAGE/VIDEO INFORMATION
INCLUDING PREDICTION INFORMATION
AND RESIDUAL INFORMATION

END

FIG. 8

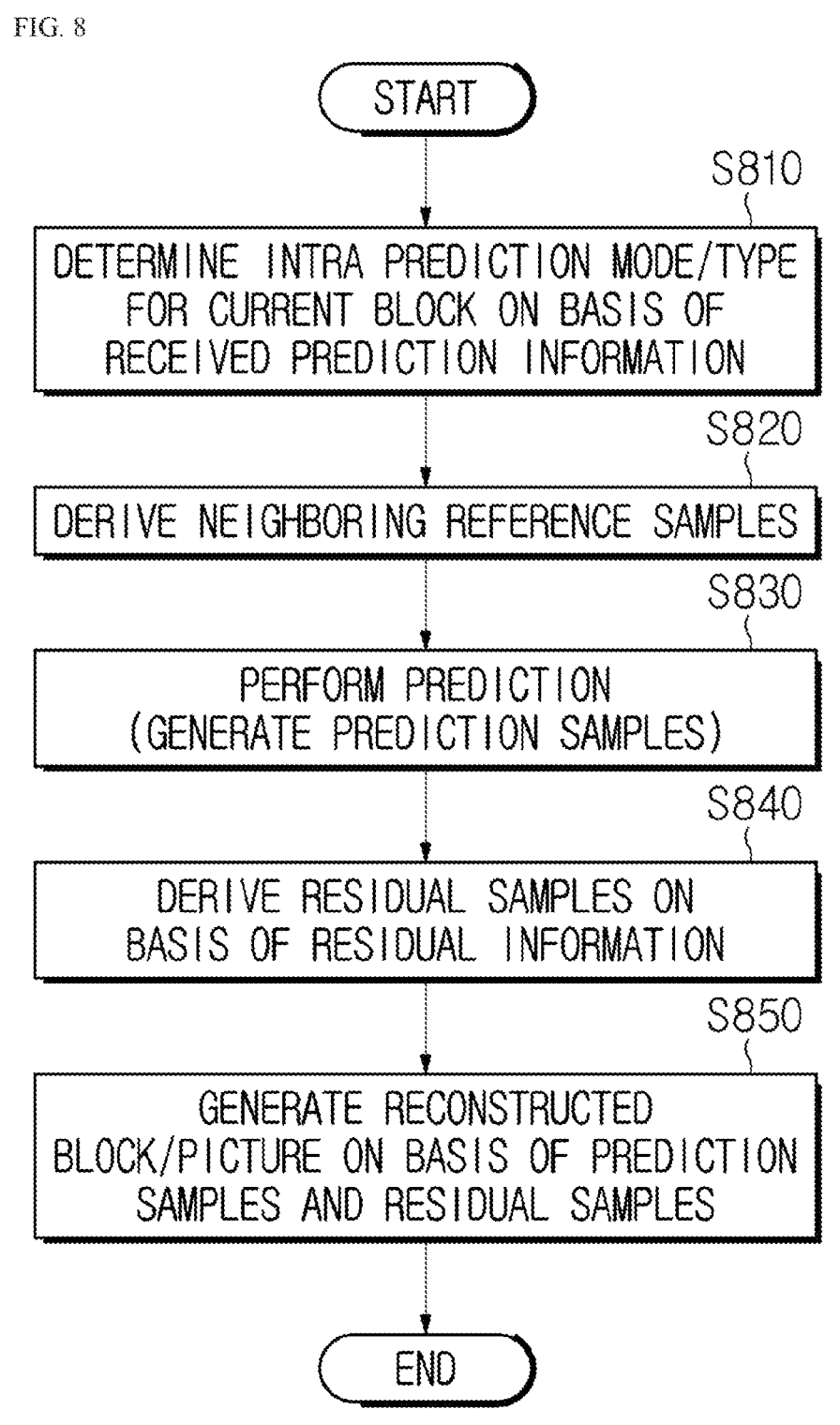

START

S810

DETERMINE INTRA PREDICTION MODE/TYPE FOR CURRENT BLOCK ON BASIS OF RECEIVED PREDICTION INFORMATION

S820

DERIVE NEIGHBORING REFERENCE SAMPLES

S830

PERFORM PREDICTION (GENERATE PREDICTION SAMPLES)

S840

DERIVE RESIDUAL SAMPLES ON BASIS OF RESIDUAL INFORMATION

S850

GENERATE RECONSTRUCTED BLOCK/PICTURE ON BASIS OF PREDICTION SAMPLES AND RESIDUAL SAMPLES

END

Figure 9:
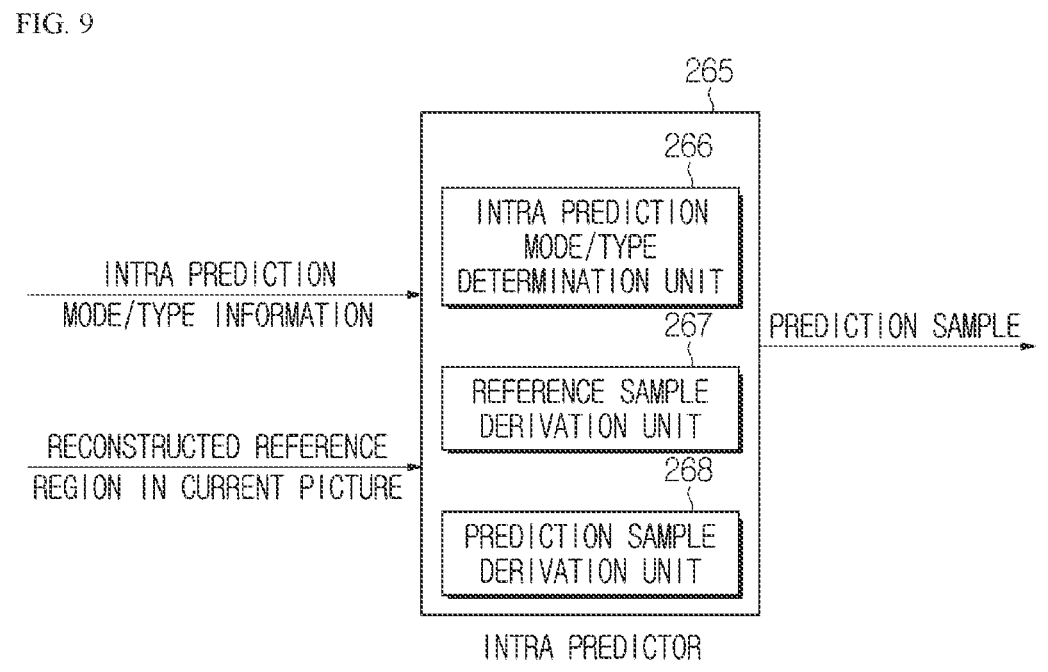

INTRA PREDICTION
MODE/TYPE
DETERMINATION UNIT

INTRA PREDICTION
MODE/TYPE INFORMATION

267

REFERENCE SAMPLE
DERIVATION UNIT

PREDICTION SAMPLE

RECONSTRUCTED REFERENCE
REGION IN CURRENT PICTURE

268

PREDICTION SAMPLE
DERIVATION UNIT

INTRA PREDICTOR

FIG. 10

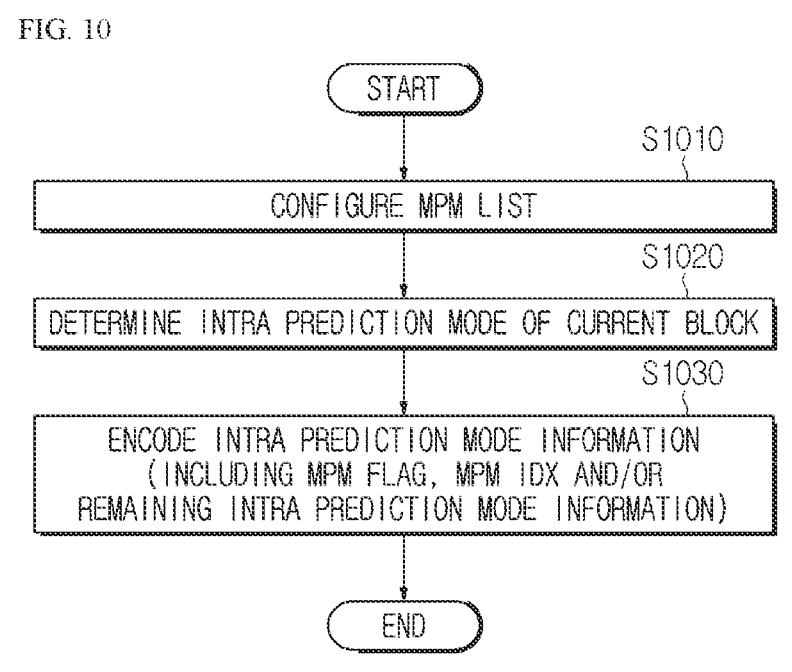

```
                    ┌──────────┐
                    │  START   │
                    └──────────┘
                          ┆
                          ┆              S1010
      ┌───────────────────────────────────────────┐
      │            CONFIGURE MPM LIST              │
      └───────────────────────────────────────────┘
                          ┆
                          ┆              S1020
      ┌───────────────────────────────────────────┐
      │ DETERMINE INTRA PREDICTION MODE OF CURRENT BLOCK │
      └───────────────────────────────────────────┘
                          ┆
                          ┆              S1030
      ┌───────────────────────────────────────────┐
      │      ENCODE INTRA PREDICTION MODE INFORMATION      │
      │       (INCLUDING MPM FLAG, MPM IDX AND/OR          │
      │    REMAINING INTRA PREDICTION MODE INFORMATION)    │
      └───────────────────────────────────────────┘
                          ┆
                    ┌──────────┐
                    │   END    │
                    └──────────┘
```

FIG. 12

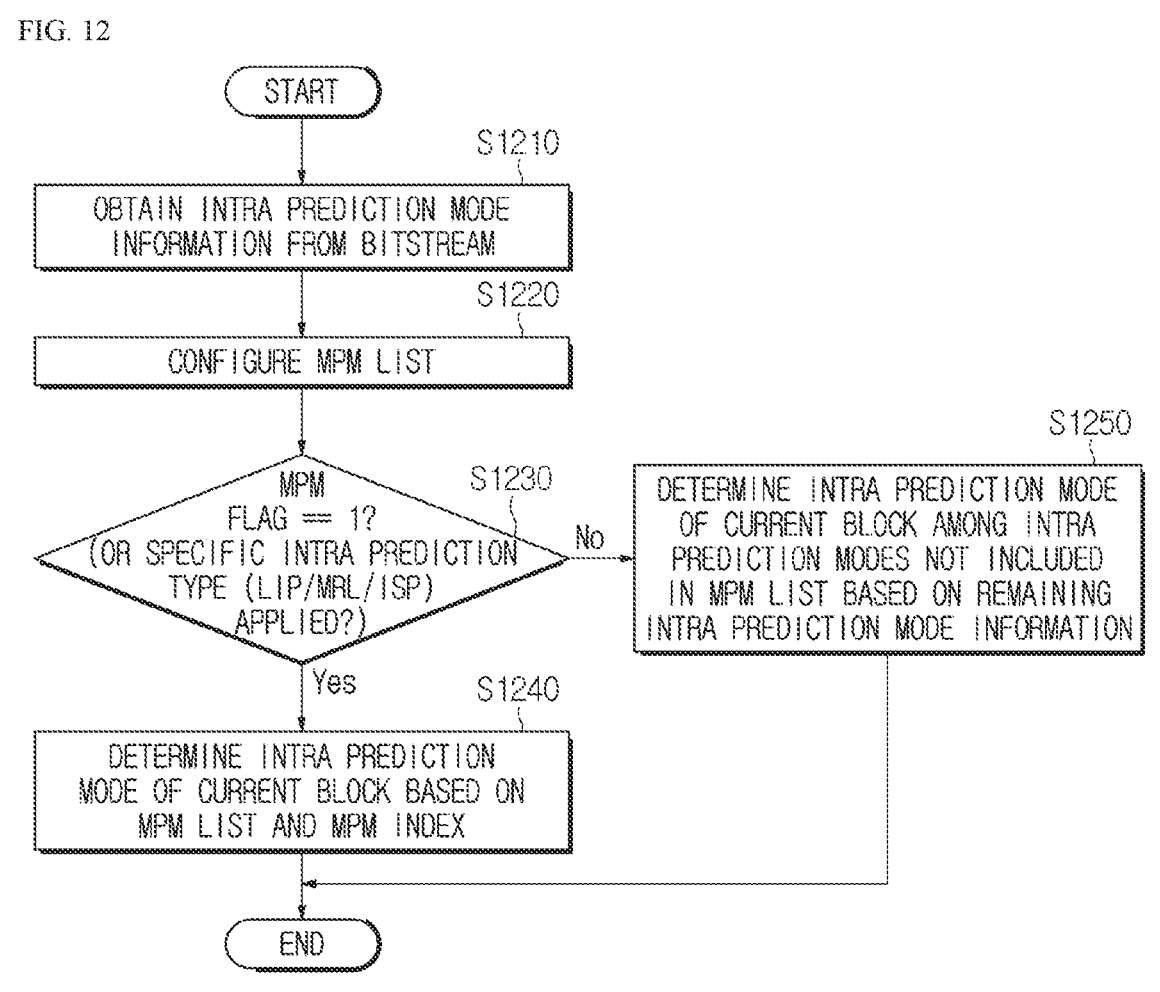

START

S1210

OBTAIN INTRA PREDICTION MODE
INFORMATION FROM BITSTREAM

S1220

CONFIGURE MPM LIST

S1230

MPM
FLAG == 1?
(OR SPECIFIC INTRA PREDICTION
TYPE (LIP/MRL/ISP)
APPLIED?)

No

S1250

DETERMINE INTRA PREDICTION MODE
OF CURRENT BLOCK AMONG INTRA
PREDICTION MODES NOT INCLUDED
IN MPM LIST BASED ON REMAINING
INTRA PREDICTION MODE INFORMATION

Yes

S1240

DETERMINE INTRA PREDICTION
MODE OF CURRENT BLOCK BASED ON
MPM LIST AND MPM INDEX

END

FIG. 20

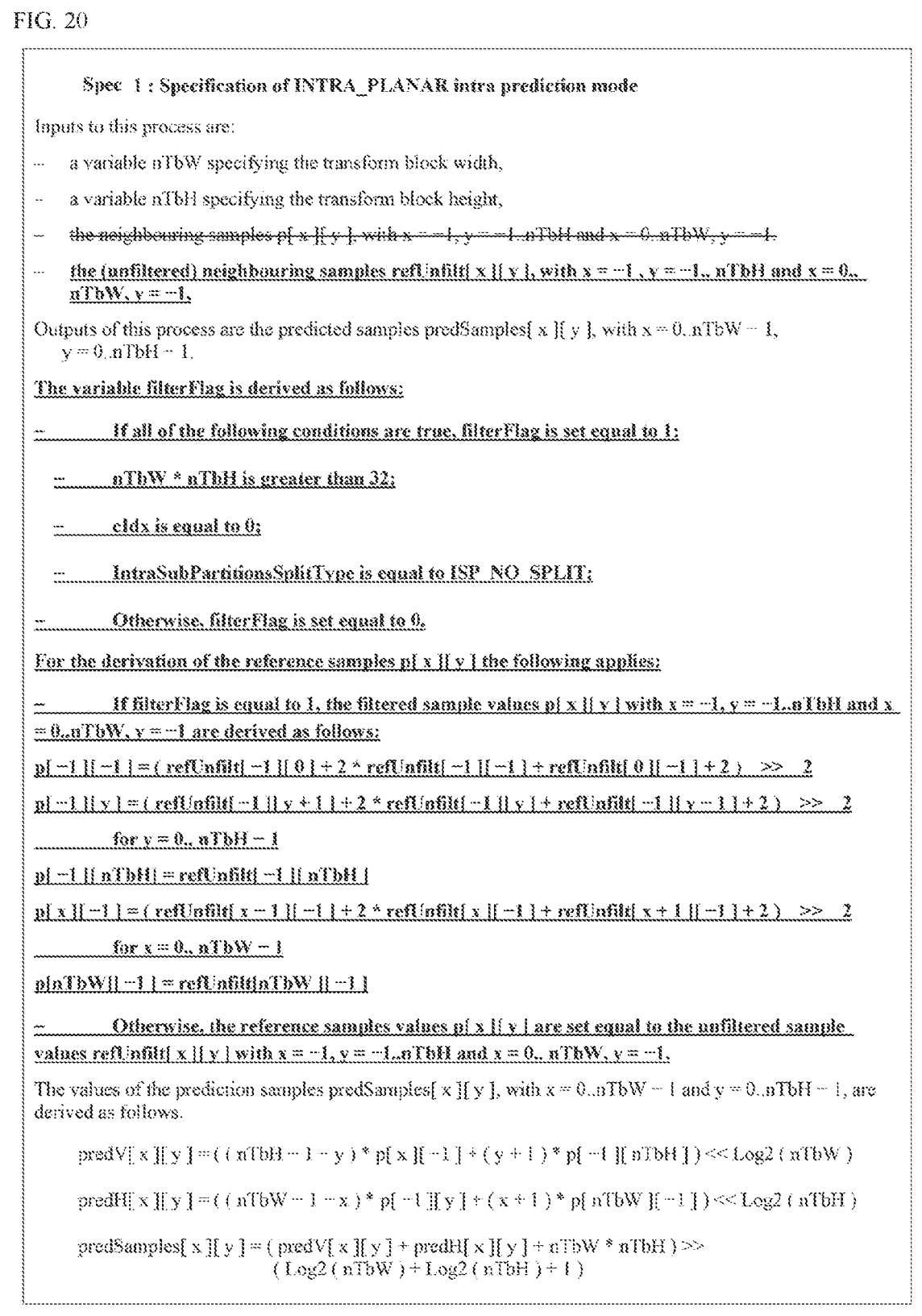

Spec 1 : Specification of INTRA_PLANAR intra prediction mode

Inputs to this process are:

-- a variable nTbW specifying the transform block width,

-- a variable nTbH specifying the transform block height,

-- ~~the neighbouring samples p[ x ][ y ], with x = −1, y = −1..nTbH and x = 0..nTbW, y = −1,~~

-- the (unfiltered) neighbouring samples refUnfilt[ x ][ y ], with x = −1, y = −1..nTbH and x = 0.. nTbW, y = −1, Outputs of this process are the predicted samples predSamples[ x ][ y ], with x = 0..nTbW − 1, y = 0..nTbH − 1.

The variable filterFlag is derived as follows:

~ If all of the following conditions are true, filterFlag is set equal to 1:

~ nTbW * nTbH is greater than 32;

~ cIdx is equal to 0;

~ IntraSubPartitionsSplitType is equal to ISP_NO_SPLIT;

~ Otherwise, filterFlag is set equal to 0.

For the derivation of the reference samples p[ x ][ y ] the following applies:

~ If filterFlag is equal to 1, the filtered sample values p[ x ][ y ] with x = −1, y = −1..nTbH and x = 0..nTbW, y = −1 are derived as follows:

p[ −1 ][ −1 ] = ( refUnfilt[ −1 ][ 0 ] + 2 * refUnfilt[ −1 ][ −1 ] + refUnfilt[ 0 ][ −1 ] + 2 )  >>  2 p[ −1 ][ y ] = ( refUnfilt[ −1 ][ y + 1 ] + 2 * refUnfilt[ −1 ][ y ] + refUnfilt[ −1 ][ y − 1 ] + 2 )  >>  2
　　　　　for y = 0.. nTbH − 1 p[ −1 ][ nTbH ] = refUnfilt[ −1 ][ nTbH ]

p[ x ][ −1 ] = ( refUnfilt[ x − 1 ][ −1 ] + 2 * refUnfilt[ x ][ −1 ] + refUnfilt[ x + 1 ][ −1 ] + 2 )  >>  2
　　　　　for x = 0.. nTbW − 1 p[ nTbW ][ −1 ] = refUnfilt[ nTbW ][ −1 ]

~ Otherwise, the reference samples values p[ x ][ y ] are set equal to the unfiltered sample values refUnfilt[ x ][ y ] with x = −1, y = −1..nTbH and x = 0.. nTbW, y = −1.

The values of the prediction samples predSamples[ x ][ y ], with x = 0..nTbW − 1 and y = 0..nTbH − 1, are derived as follows.

predV[ x ][ y ] = ( ( nTbH − 1 − y ) * p[ x ][ −1 ] + ( y + 1 ) * p[ −1 ][ nTbH ] ) << Log2 ( nTbW )

predH[ x ][ y ] = ( ( nTbW − 1 − x ) * p[ −1 ][ y ] + ( x + 1 ) * p[ nTbW ][ −1 ] ) << Log2 ( nTbH )

predSamples[ x ][ y ] = ( predV[ x ][ y ] + predH[ x ][ y ] + nTbW * nTbH ) >>
　　　　　　　( Log2 ( nTbW ) + Log2 ( nTbH ) + 1 )

FIG. 21

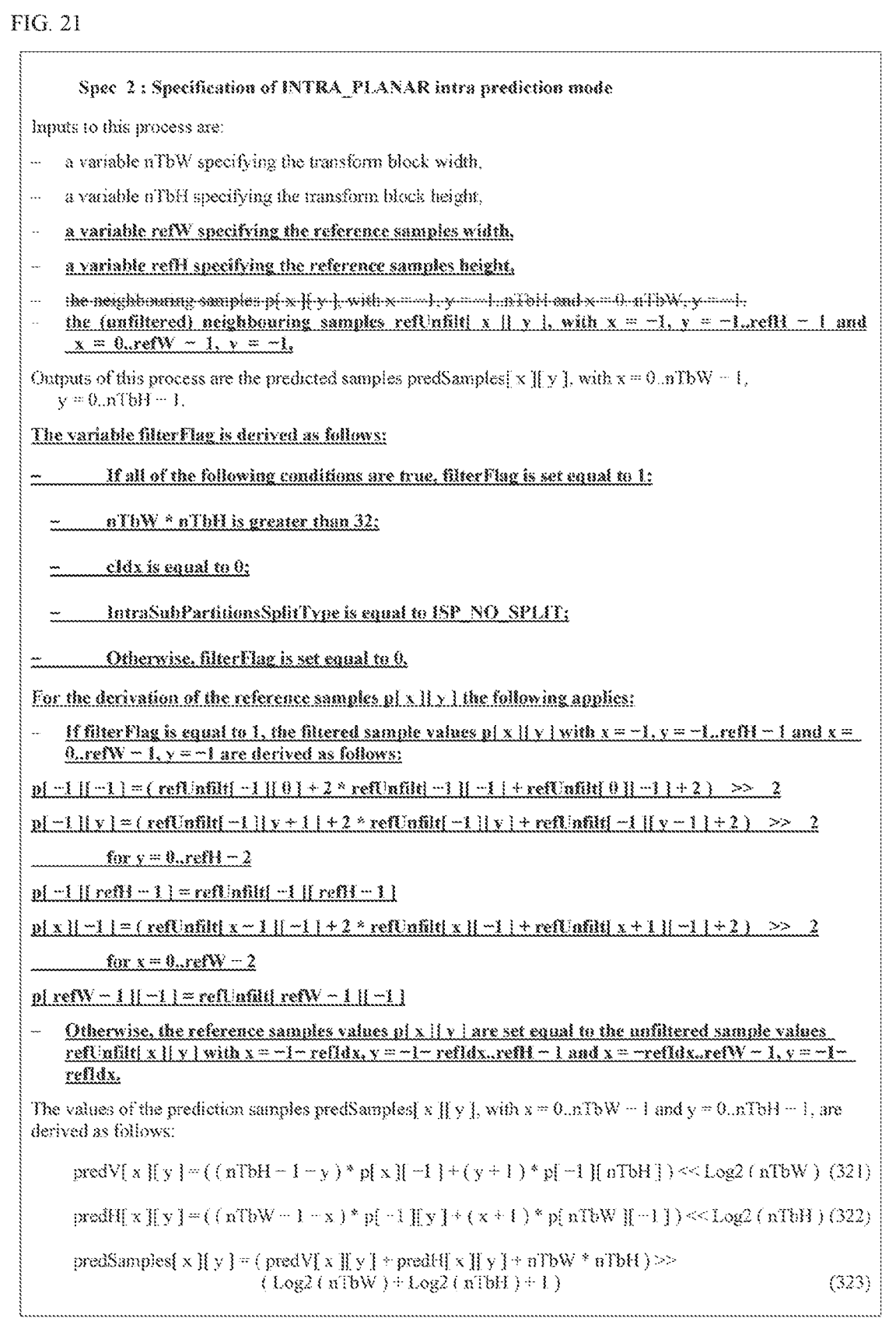

Spec 2 : Specification of INTRA_PLANAR intra prediction mode

Inputs to this process are:

- a variable nTbW specifying the transform block width,
- a variable nTbH specifying the transform block height,
- a variable refW specifying the reference samples width,
- a variable refH specifying the reference samples height,
- ~~the neighbouring samples p[ x ][ y ], with x = −1, y = −1..nTbH and x = 0..nTbW, y = −1,~~
- the (unfiltered) neighbouring samples refUnfilt[ x ][ y ], with x = −1, y = −1..refH − 1 and x = 0..refW − 1, y = −1,

Outputs of this process are the predicted samples predSamples[ x ][ y ], with x = 0..nTbW − 1, y = 0..nTbH − 1.

The variable filterFlag is derived as follows:

- If all of the following conditions are true, filterFlag is set equal to 1:

- **nTbW * nTbH is greater than 32;**

- cIdx is equal to 0;

- IntraSubPartitionsSplitType is equal to ISP_NO_SPLIT;

- Otherwise, filterFlag is set equal to 0.

For the derivation of the reference samples p[ x ][ y ] the following applies:

- If filterFlag is equal to 1, the filtered sample values p[ x ][ y ] with x = −1, y = −1..refH − 1 and x = 0..refW − 1, y = −1 are derived as follows:

**p[ −1 ][ −1 ] = ( refUnfilt[ −1 ][ 0 ] + 2 * refUnfilt[ −1 ][ −1 ] + refUnfilt[ 0 ][ −1 ] + 2 ) >> 2**

**p[ −1 ][ y ] = ( refUnfilt[ −1 ][ y + 1 ] + 2 * refUnfilt[ −1 ][ y ] + refUnfilt[ −1 ][ y − 1 ] + 2 ) >> 2**
          for y = 0..refH − 2 p[ −1 ][ refH − 1 ] = refUnfilt[ −1 ][ refH − 1 ]

**p[ x ][ −1 ] = ( refUnfilt[ x − 1 ][ −1 ] + 2 * refUnfilt[ x ][ −1 ] + refUnfilt[ x + 1 ][ −1 ] + 2 ) >> 2**
          for x = 0..refW − 2 p[ refW − 1 ][ −1 ] = refUnfilt[ refW − 1 ][ −1 ]

- Otherwise, the reference samples values p[ x ][ y ] are set equal to the unfiltered sample values refUnfilt[ x ][ y ] with x = −1 − refIdx, y = −1 − refIdx..refH − 1 and x = −refIdx..refW − 1, y = −1 − refIdx.

The values of the prediction samples predSamples[ x ][ y ], with x = 0..nTbW − 1 and y = 0..nTbH − 1, are derived as follows:

predV[ x ][ y ] = ( ( nTbH − 1 − y ) * p[ x ][ −1 ] + ( y + 1 ) * p[ −1 ][ nTbH ] ) << Log2 ( nTbW ) (321)

predH[ x ][ y ] = ( ( nTbW − 1 − x ) * p[ −1 ][ y ] + ( x + 1 ) * p[ nTbW ][ −1 ] ) << Log2 ( nTbH ) (322)

predSamples[ x ][ y ] = ( predV[ x ][ y ] + predH[ x ][ y ] + nTbW * nTbH ) >>
          ( Log2 ( nTbW ) + Log2 ( nTbH ) + 1 ) (323)

1

IMAGE ENCODING/DECODING METHOD AND APPARATUS FOR PERFORMING REFERENCE SAMPLE FILTERING ON BASIS OF INTRA PREDICTION MODE, AND METHOD FOR TRANSMITTING BITSTREAM

CROSS-REFERENCE TO RELATED APPLICATIONS

This application is a National Stage application under 35 U.S.C. § 371 of International Application No. PCT/KR2022/012317, filed on Aug. 18, 2022, which claims the benefit of Korean Patent Application No. 10-2021-0108572, filed on Aug. 18, 2021. The disclosures of the prior applications are incorporated by reference in their entirety.

TECHNICAL FIELD

The present disclosure relates to an image encoding/decoding method and apparatus, and, more particularly, to an image encoding/decoding method and apparatus for performing reference sample filtering based on an intra prediction mode and a method of transmitting a bitstream generated by the image encoding method/apparatus of the present disclosure.

BACKGROUND ART

Recently, demand for high-resolution and high-quality images such as high definition (HD) images and ultra high definition (U-ID) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Also, an object of the present disclosure is to provide an image encoding/decoding method and apparatus for performing reference sample filtering based on an intra prediction mode.

Also, an object of the present disclosure is to provide an image encoding/decoding method and apparatus for performing reference sample filtering based on one of a plurality of filters.

Also, an object of the present disclosure is to provide an image encoding/decoding method and apparatus for performing reference sample filtering based on a specific intra prediction mode.

Also, an object of the present disclosure is to provide a method of transmitting a bitstream generated by an image encoding method or apparatus according to the present disclosure.

Also, an object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

According to an embodiment of the present disclosure, an image decoding method performed by an image decoding apparatus may comprise determining an intra prediction mode of a current block, performing planar intra prediction based on the intra prediction mode being a planar prediction mode and obtaining a reconstructed sample of the current block based on a prediction sample obtained based on the planar intra prediction. The performing the planar intra prediction may comprise applying filtering to an intra prediction reference sample of the current block.

According to an embodiment of the present disclosure, the filtering may be performed by adaptively selecting one from a plurality of filters including a first filter or a second filter.

According to an embodiment of the present disclosure, the one filter may be selected based on the number of intra prediction reference samples.

According to an embodiment of the present disclosure, the first filter may be a 3-tap filter and the second filter may be a 5-tap filter.

According to an embodiment of the present disclosure, the 3-tap filter may be [1, 2, 1].

According to an embodiment of the present disclosure, the 5-tap filter may be [1, 4, 6, 4, 1].

According to an embodiment of the present disclosure, the number of intra prediction reference samples may be determined based on a size of the current block.

According to an embodiment of the present disclosure, the number of intra prediction reference samples may be determined based on comparison between the size of the current block and a certain value.

According to an embodiment of the present disclosure, the applying of the filtering may be determined based on whether to apply decoder side intra mode derivation (DIMD).

According to an embodiment of the present disclosure, the applying of the filtering may be determined based on whether to apply combined inter intra prediction (CIIP)

According to an embodiment of the present disclosure, the filtering may be applied regardless of a color component of the current block.

According to an embodiment of the present disclosure, the filtering may be applied regardless of a size of the current block.

According to an embodiment of the present disclosure, all filter coefficients used for the filtering may be positive numbers.

According to an embodiment of the present disclosure, an image decoding apparatus may comprise a memory and at least one processor. The at least one processor may determine an intra prediction mode of a current block, perform planar intra prediction based on the intra prediction mode being a planar prediction mode and obtain a reconstructed sample of the current block based on a prediction sample obtained based on the planar intra prediction. The planar intra prediction may be performed by applying filtering to an intra prediction reference sample of the current block.

According to an embodiment of the present disclosure, an image encoding method performed by an image encoding apparatus may comprise determining an intra prediction mode of a current block, performing planar intra prediction based on the intra prediction mode being a planar prediction mode and obtaining a reconstructed sample of the current block based on a prediction sample obtained from the planar intra prediction. The performing the planar intra prediction may comprise applying filtering to an intra prediction reference sample of the current block.

According to an embodiment of the present disclosure, a bitstream generated by an image encoding apparatus or an image encoding method may be transmitted.

According to an embodiment of the present disclosure, in a method of transmitting a bitstream generated by an image encoding method, the image encoding method may comprise determining an intra prediction mode of a current block, performing planar intra prediction based on the intra prediction mode being a planar prediction mode and obtaining a reconstructed sample of the current block based on a prediction sample obtained from the planar intra prediction. The performing the planar intra prediction may comprise applying filtering to an intra prediction reference sample of the current block.

According to an embodiment of the present disclosure, a bitstream generated by an image encoding method may be stored and recorded in a computer-readable medium.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, an image encoding/decoding method and apparatus for performing reference sample filtering based on an intra prediction mode can be provided.

Also, according to the present disclosure, an image encoding/decoding method and apparatus for performing reference sample filtering based on a planar intra prediction mode can be provided.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 1 is a view schematically showing a video coding system, to which an embodiment of the present disclosure is applicable.

FIG. 8 is a flowchart illustrating an intra prediction based video/image decoding method.

FIG. 9 is a view illustrating a configuration of the intra predictor 265 according to the present disclosure.

FIG. 10 is a flowchart illustrating an intra prediction mode signaling procedure in an image encoding apparatus.

FIG. 12 is a flowchart illustrating an intra prediction mode derivation procedure in greater detail.

FIG. 20 is a view illustrating a planar intra prediction mode procedure according to an embodiment of the present disclosure.

FIG. 21 is a view illustrating a planar intra prediction node procedure according to another embodiment of the present disclosure.

MODE FOR INVENTION

Figure 2:
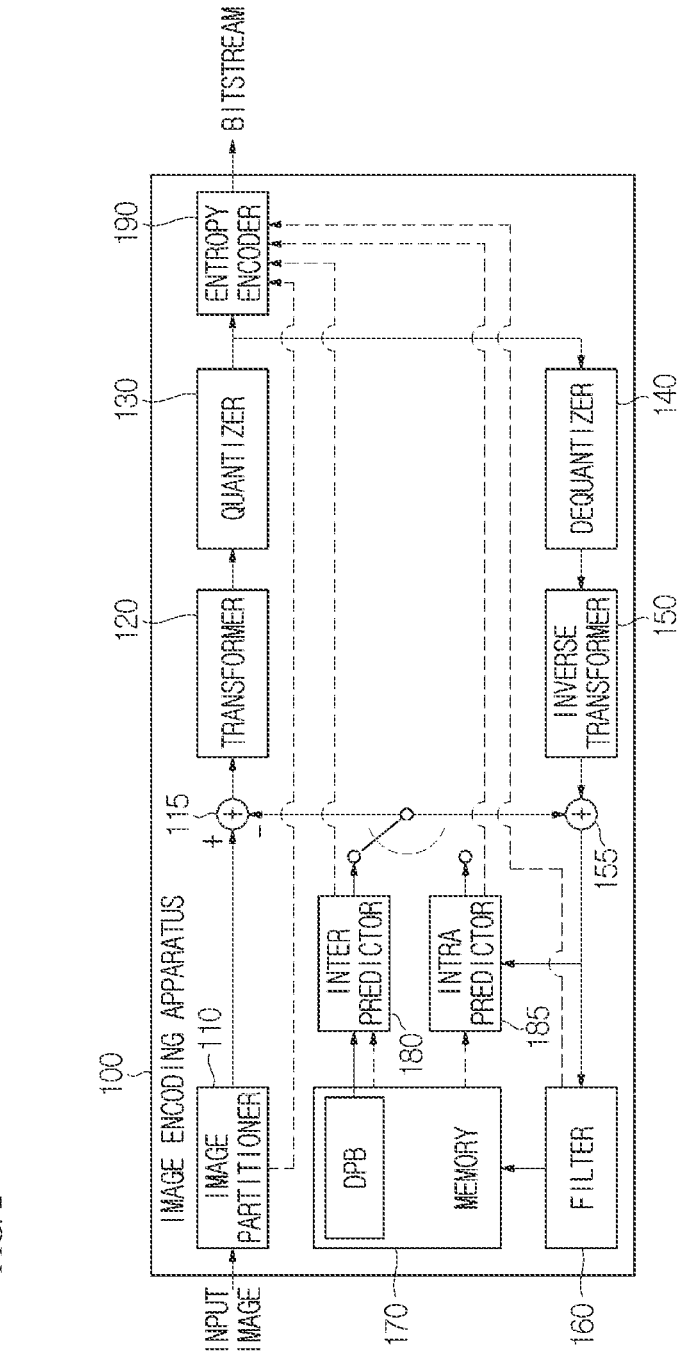
FIG. 2 is a view schematically showing an image encoding apparatus, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected". "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, "picture" generally means the basis representing one image in a particular time period, and a slice/tile is an encoding basis constituting a part of a picture. One picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. One unit may include one luma block and two chroma (e.g., Cb, Cr) blocks. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit" "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or". For instance, the expression "A/B" and "A, B" may mean "A and/or B." Further, "A/B/C" and "A, B, C" may mean "at least one of A. B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

Figure 1:
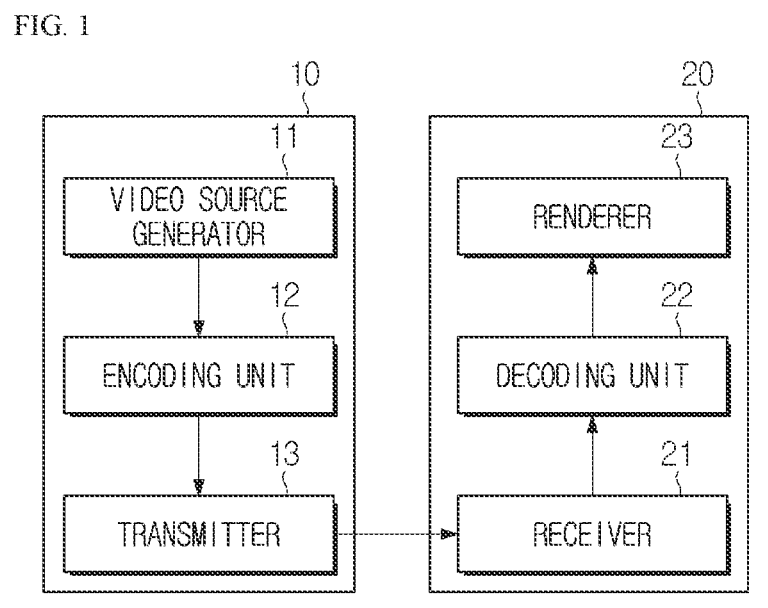

FIG. 1 is a view showing a video coding system according to the present disclosure.

The video coding system according to an embodiment may include an encoding device 10 and a decoding device 20. The encoding device 10 may deliver encoded video and/or image information or data to the decoding device 20 in the form of a file or streaming via a digital storage medium or network.

The encoding device 10 according to an embodiment may include a video source generator 11, an encoding unit (encoder) 12 and a transmitter 13. The decoding device 20 according to an embodiment may include a receiver 21, a decoding unit (decoder) 22 and a renderer 23. The encoding unit 12 may be called a video/image encoding apparatus, and the decoding unit 22 may be called a video/image decoding apparatus. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding device 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit (inter predictor) 180, an intra prediction unit (intra predictor) 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit (intra predictor) 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit (inter predictor) 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
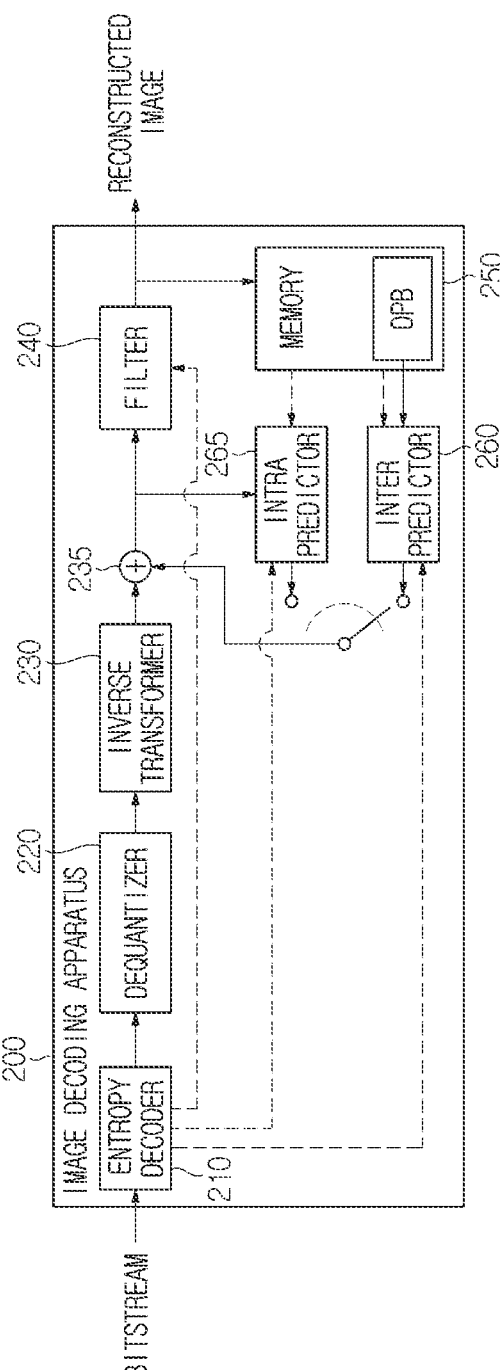
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit (inter predictor) 260 and an intra prediction unit 265. The inter predictor (inter prediction unit) 260 and the intra predictor (intra prediction unit) 265 may be collectively referred to as a "prediction unit (predictor)". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 170 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter predictor 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not show) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 160 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra predictor 265 may predict the current block by referring to the samples in the current picture. The description of the intra prediction unit 185 is equally applied to the intra prediction unit 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter predictor 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter predictor 260, and the intra predictor 265 of the image decoding apparatus 200.

Overview of Partitioning of CTU

As described above, the coding unit may be acquired by recursively partitioning the coding tree unit (CTU) or the largest coding unit (LCU) according to a quad-tree/binary-tree/ternary-tree (QT/BT/TT) structure. For example, the CTU may be first partitioned into quadtree structures. Thereafter, leaf nodes of the quadtree structure may be further partitioned by a multi-type tree structure.

Partitioning according to quadtree means that a current CU (or CTU) is partitioned into equally four. By partitioning according to quadtree, the current CU may be partitioned into four CUs having the same width and the same height. When the current CU is no longer partitioned into the quadtree structures, the current CU corresponds to the leaf node of the quad-tree structure. The CU corresponding to the leaf node of the quadtree structure may be no longer partitioned and may be used as the above-described final coding unit. Alternatively, the CUI corresponding to the leaf node of the quadtree structure may be further partitioned by a multi-type tree structure.

Figure 4:
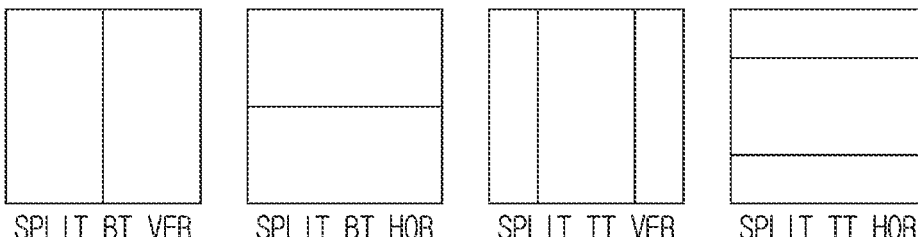
FIG. 4 is a view showing a partitioning type of a block according to a multi-type tree structure.

FIG. 4 is a view showing a partitioning type of a block according to a multi-type tree structure. Partitioning according to the multi-type tree structure may include two types of splitting according to a binary tree structure and two types of splitting according to a ternary tree structure.

Figure 5:
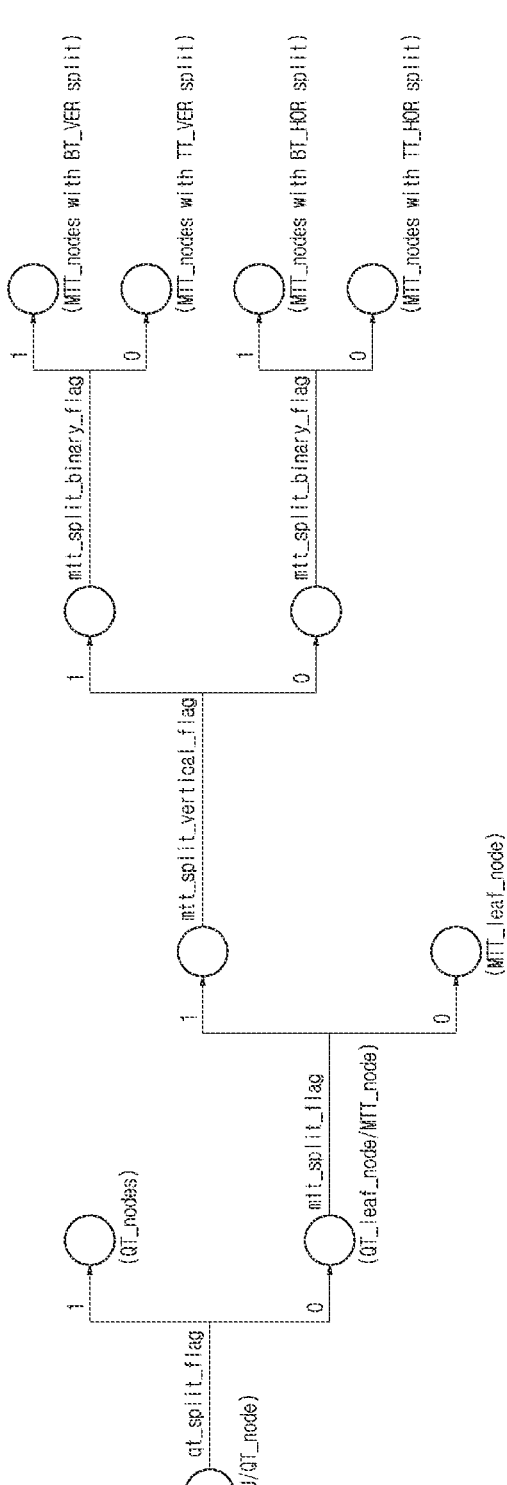
FIG. 5 is a view showing a signaling mechanism of partition splitting information in a quadtree with nested multi-type tree structure according to the present disclosure.

The two types of splitting according to the binary tree structure may include vertical binary splitting (SPLIT_BT_VER) and horizontal binary splitting (SPLIT_BT_HOR). Vertical binary splitting (SPLIT_BT_VER) means that the current CU is split into equally two in the vertical direction. As shown in FIG. 4, by vertical binary splitting, two CUs having the same height as the current CU and having a width which is half the width of the current CU may be generated. Horizontal binary splitting (SPLIT_BT_HOR) means that the current CU is split into equally two in the horizontal direction. As shown in FIG. 5, by horizontal binary splitting, two CUs having a height which is half the height of the current CU and having the same width as the current CU may be generated.

Two types of splitting according to the ternary tree structure may include vertical ternary splitting (SPLIT_TT_VER) and horizontal ternary splitting (SPLIT_TT_HOR). In vertical ternary splitting (SPLIT_TT_VER), the current CU is split in the vertical direction at a ratio of 1:2:1. As shown in FIG. 4, by vertical ternary splitting, two CUs having the same height as the current CU and having a width which is ¼ of the width of the current CU and a CU having the same height as the current CU and having a width which is half the width of the current CU may be generated. In horizontal ternary splitting (SPLIT_TT_HOR), the current CU is split in the horizontal direction at a ratio of 1:2:1. As shown in FIG. 5, by horizontal ternary splitting, two CUs having a height which is ¼ of the height of the current CU and having the same width as the current CU and a CU having a height which is half the height of the current CU and having the same width as the current CU may be generated.

FIG. 5 is a view showing a signaling mechanism of partition splitting information in a quadtree with nested multi-type tree structure according to the present disclosure.

Here, the CTU is treated as the root node of the quadtree, and is partitioned for the first time into a quadtree structure. Information (e.g., qt_split_flag) indicating whether quadtree splitting is performed with respect to the current CU (CTU or node (QT_node) of the quadtree) may be signaled. For example, when qt_split_flag has a first value (e.g., "1"), the current CU may be quadtree-partitioned. In addition, when qt_split_flag has a second value (e.g., "0"), the current CU is not quadtree-partitioned, but becomes the leaf node (QT_leaf_node) of the quadtree. Each quadtree leaf node may then be further partitioned into multitype tree structures. That is, the leaf node of the quadtree may become the node (MTT_node) of the multi-type tree. In the multitype tree structure, a first flag (e.g., Mtt_split_cu flag) may be signaled to indicate whether the current node is additionally partitioned. If the corresponding node is addition ill partitioned (e.g., if the first flag is 1), a second flag (e.g., Mtt_split_cu_vertical_flag) may be signaled to indicate the splitting direction. For example, the splitting direction may be a vertical direction if the second flag is 1 and may be a horizontal direction if the second flag is 0. Then, a third flag (eg., Mtt_split_cu_binary_flag) may be signaled to indicate whether the split type is a binary split type or a ternary split type. For example, the split type may be a binary split type when the third flag is 1 and may be a ternary split type when the third flag is 0. The node of the multi-type tree acquired by binary splitting or ternary splitting may be further partitioned into multi-type tree structures. However, the node of the multi-type tree may not be partitioned into quadtree structures. If the first flag is 0, the corresponding node of the multi-type tree is no longer split but becomes the leaf node (MTT_leaf_node) of the multi-type tree. The CU corresponding to the leaf node of the multi-type tree may be used as the above-described final coding unit.

Based on the mtt_split_cu_vertical_flag and the mtt_split_cu_binary_flag, a multi-type tree splitting mode (MttSplitMode) of a CU may be derived as shown in Table 1 below.

TABLE 1

| MttSplitMode | mtt_split_cu_verti-cal_flag | mtt_split_cu_bina-ry_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

One CTU may include a coding block of luma samples (hereinafter referred to as a "luma block") and two coding blocks of chroma samples corresponding thereto (hereinafter referred to as "chroma blocks"). The above-described coding tree scheme may be equally or separately applied to the luma block and chroma block of the current CU. Specifically, the luma and chroma blocks in one CTU may be partitioned into the same block tree structure and, in this case, the tree structure may be represented as SINGLE_TREE. Alternatively, the luma and chroma blocks in one CTU may be partitioned into separate block tree structures, and, in this case, the tree structure may be represented as DUAL_TREE. That is, when the CTU is partitioned into dual trees, the block tree structure for the luma block and the block tree structure for the chroma block may be separately present. In this case, the block tree structure for the luma block may be called DUAL_TREE_LUMA, and the block tree structure for the chroma component may be called DUAL_TREE_CHROMA. For P and B slice/tile groups, luma and chroma blocks in one CTU may be limited to have the same coding tree structure. However, for I slice/tile groups, luma and chroma blocks may have a separate block tree structure from each other. If the separate block tree structure is applied, the luma CTB may be partitioned into CUs based on a particular coding tree structure, and the chroma CTB may be partitioned into chroma CUs based on another coding tree structure. That is, this means that a CU in an I slice/tile group, to which the separate block tree structure is applied, may be composed of a coding block of luma components or coding blocks of two chroma components. In addition, a CU in an I slice/tile group, to which the same block tree structure is applied, and a CU of a P or B slice/tile group may be composed of blocks of three color components (a luma component and two chroma components).

Although a quadtree coding tree structure with a nested multitype tree has been described, a structure in which a CU is partitioned is not limited thereto. For example, the BT structure and the TT structure may be interpreted as a concept included in a multiple partitioning tree (MPT) structure, and the CU may be interpreted as being partitioned through the QT structure and the MPT structure. In an example where the CU is partitioned through a QT structure and an MPT structure, a syntax element (e.g., MPT_split_type) including information on how many blocks the leaf node of the QT structure is partitioned into and a syntax element (ex. MPT_split_mode) including information on which of vertical and horizontal directions the leaf node of the QT structure is partitioned into may be signaled to determine a partitioning structure.

In another example, the CU may be partitioned in a different way than the QT structure, BT structure or TT structure. That is, unlike that the CU of the lower depth is partitioned into ¼ of the CU of the higher depth according to the QT structure, the CU of the lower depth is partitioned into ½ of the CU of the higher depth according to the BT structure, or the CU of the lower depth is partitioned into ¼ or ½ of the CU of the higher depth according to the TT structure, the CU of the lower depth may be partitioned into ⅕, ⅓, ⅜, ⅗, ⅔, or ⅝ of the CU of the higher depth in some cases, and the method of partitioning the CU is not limited thereto.

Overview of Intra Prediction

Hereinafter, intra prediction according to the present disclosure will be described.

Intra prediction may represent prediction for generating prediction samples for a current block based on reference samples in a picture to which a current block belongs (hereinafter referred to as a current picture). When intra prediction applies to a current block, neighboring reference samples to be used for intra prediction of the current block may be derived. The neighboring reference samples of the current block may include a total of 2×nh samples neighbor/adjacent to a left boundary of the current block having a size of nW×nH and samples adjacent to a bottom-left, a total of 2×nW samples adjacent to a top boundary of the current block and samples adjacent to a top-right, and one sample adjacent to a top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to a right boundary of the current block having a size of nW×nH, a total of nW samples adjacent to a bottom boundary of the current block and one sample adjacent to a bottom-right of the current block.

However, some of the neighboring reference samples of the current block have not yet been decoded or may not be available. In this case, the decoder may construct neighboring reference samples to be used for prediction by substituting unavailable samples with available samples. Alternatively, neighboring reference samples to be used for prediction may be constructed through interpolation of available samples.

When the neighboring reference samples are derived, (i) a prediction sample may be derived based on an average or interpolation of neighboring reference samples of the current block, and (ii) the prediction sample may be derived based on a reference sample present in a specific (prediction) direction with respect to the prediction sample among the neighboring reference samples of the current block. The case of (i) may be called a non-directional mode or a non-angular mode, and the case of (ii) may be called a directional mode or an angular mode.

Also, the prediction sample may be generated through interpolation of the first neighboring sample positioned in the prediction direction of the intra prediction mode of the current block based on the prediction target sample of the current block among the neighboring reference samples and the second neighboring sample positioned in the opposite direction thereof. The above-described case may be referred to as linear interpolation intra prediction (LIP).

In addition, chroma prediction samples may be generated based on luma samples using a linear model. This case may be called an LM (linear model) mode.

In addition, a temporary prediction sample of the current block may be derived based on the filtered neighboring reference samples, and the prediction sample of the current block may be derived by a weighted sum of at least one reference sample derived according to the intra prediction mode among the existing neighboring reference samples, that is, unfiltered neighboring reference samples, and the temporary prediction sample. The above-described case may be referred to as position dependent intra prediction (PDPC).

In addition, a reference sample line with the highest prediction accuracy is selected from among multiple neighboring reference sample lines of the current block, to derive the prediction sample using the reference sample located in the prediction direction in the corresponding line, and, at this time, information on the used reference sample line (e.g., intra_luma_ref_idx) may be encoded in a bitstream and signaled. This case may be referred to as multi-reference line (MRL) intra prediction or MRL-based intra prediction. When MRL is not applied, reference samples may be derived from reference sample lines directly adjacent to the current block and in this case, information on the reference sample lines may not be signaled.

In addition, the current block may be partitioned into vertical or horizontal sub-partitions and intra prediction may be performed based on the same intra prediction mode for each subpartition. In this case, the neighboring reference samples of the intra prediction may be derived in units of sub-partitions. That is, the reconstructed sample of the previous sub-partition in the encoding/decoding order may be used as the neighboring reference sample of the current sub-partition. In this case, the intra prediction mode for the current block is equally applied to the sub-partitions, but the intra prediction performance may be improved in some cases by deriving and using neighboring reference samples in units of sub-partitions. This prediction method may be called intra sub-partitions (ISP) or ISP-based intra prediction.

These intra prediction techniques may be called an intra prediction type or additional intra prediction mode to be distinguished from a direction or non-directional intra prediction mode. The intra prediction technique (intra prediction type, additional intra prediction mode, etc.) may be referred to as various terms such as an intra prediction technique or an additional intra prediction mode. For example, the intra prediction type (or additional intra prediction mode, etc.) may include at least one of the aforementioned LIP, LM, PDPC, MRL or ISP. A general intra prediction method excluding a specific intra prediction type such as LIP, LM, PDPC, MRL, and ISP may be referred to as a normal intra prediction type. The normal intra prediction type may be generally applied when the above specific intra prediction type is not applied, and prediction may be performed based on the above-described intra prediction mode. Meanwhile, if necessary, post-processing filtering may be performed on the derived prediction sample.

Specifically, the intra prediction procedure may include an intra prediction mode/type determination step, a neighboring reference sample derivation step, and an intra prediction mode/type based prediction sample derivation step. In addition, if necessary, a post-filtering step may be performed on the derived prediction sample.

Figure 6:
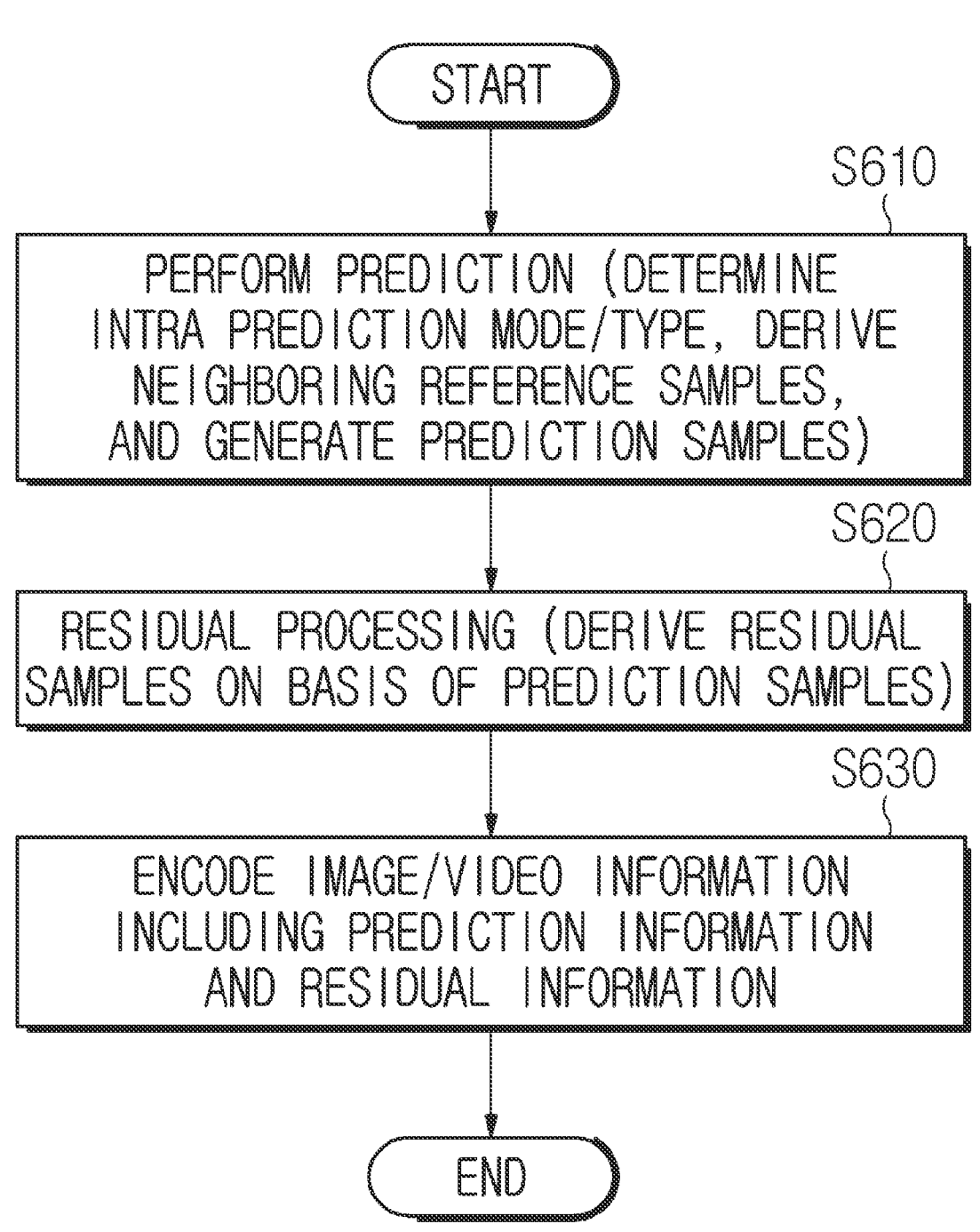
FIG. 6 is a flowchart illustrating an intra prediction based video/image encoding method.

FIG. 6 is a flowchart illustrating an intra prediction based video/image encoding method.

The encoding method of FIG. 6 may be performed by the image encoding apparatus of FIG. 2. Specifically, step S610 may be performed by the Intra prediction unit 185 and step S620 may be performed by the residual processor. Specifically, step S620 may be performed by the subtractor 115. Step S630 may be performed by the entropy encoder 190. The prediction information of step S630 may be derived by the intra prediction unit 185, and the residual information of step S630 may be derived by the residual processor. The residual information is information on residual samples. The residual information may include information on quantized transform coefficients for the residual samples. As described above, the residual samples may be derived as transform coefficients through the transformer 120 of the encoding apparatus, and the transform coefficients may be derived as quantized transform coefficients through the quantizer 130. Information on the quantized transform coefficients may be encoded by the entropy encoder 190 through a residual coding procedure.

The encoding apparatus may perform intra prediction with respect to the current block (S610). The encoding apparatus may derive an intra prediction mode/type for the current block, derive neighboring reference samples of the current block, and generate prediction samples in the current block based on the intra prediction mode/type and the neighboring reference samples. Here, a procedure for determining an intra prediction mode/type, a procedure for deriving neighboring reference samples and a procedure for generating prediction samples may be simultaneously performed, or any one procedure may be performed before another procedure.

Figure 7:
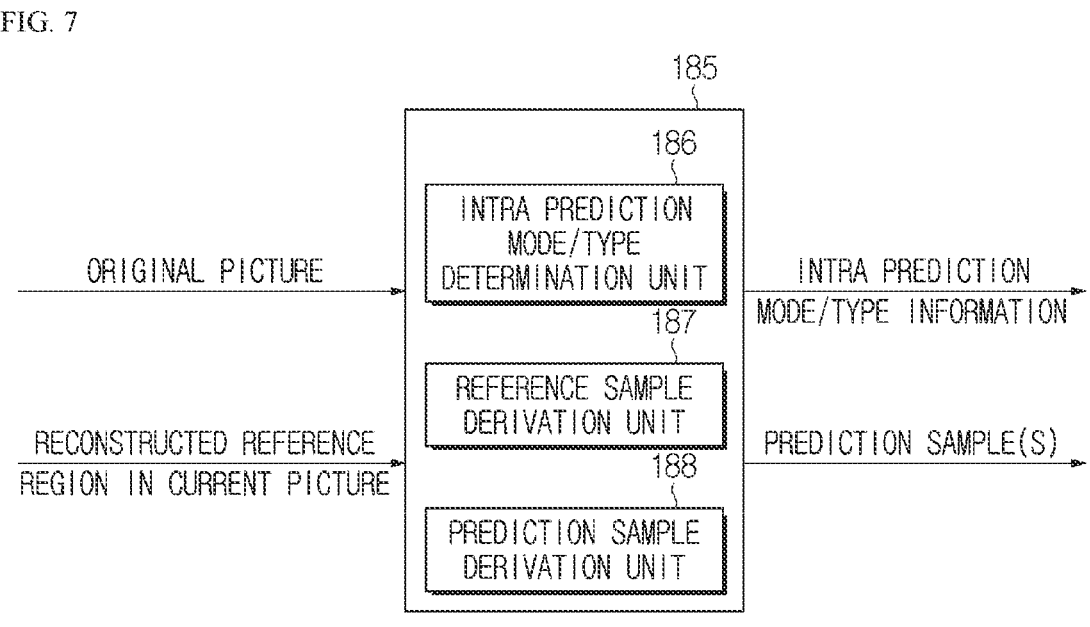
FIG. 7 is a view illustrating a configuration of the intra prediction unit 185 according to the present disclosure.

FIG. 7 is a view illustrating a configuration of the intra prediction unit (intra predictor) 185 according to the present disclosure.

As shown in FIG. 7, the intra prediction unit 185 of the encoding apparatus may include an intra prediction mode/type determination unit 186, a reference sample derivation unit 187, a prediction sample derivation unit 188. The intra prediction mode/type determination unit 186 may determine the intra prediction mode/type for the current block, the reference sample derivation unit 187 may derive neighboring reference samples of the current block, and the prediction sample derivation unit 188 may derive the prediction samples of the current block. Meanwhile, although not shown, when the below-described prediction sample filtering procedure is performed, the intra prediction unit 185 may further include a prediction sample filter (not shown).

The image encoding apparatus may determine a mode/type applied to the current block from among a plurality of intra prediction modes/types. The encoding apparatus may compare RD costs of the intra prediction modes/types and determine an optimal intra prediction mode/type for the current block.

Meanwhile, the image encoding apparatus may perform a prediction sample filtering procedure. Predictive sample filtering may be referred to as post filtering. Some or all of the prediction samples may be filtered by the prediction sample filtering procedure. In some cases, the prediction sample filtering procedure may be omitted.

Referring to FIG. 6 again, the image encoding apparatus may generate residual samples for the current block based on prediction samples or filtered prediction samples (S620). The image encoding apparatus may derive the residual samples by subtracting the prediction samples from the original samples of the current block. That is, the image encoding apparatus may derive the residual sample value by subtracting the prediction sample value from the original sample value.

The image encoding apparatus may encode image information including information on intra prediction (prediction information) and residual information of the residual samples (S630). The prediction information may include the intra prediction mode information and the intra prediction type information. The encoding apparatus may output encoded image information in the form of a bitstream. The output bitstream may be transmitted to the decoding apparatus through a storage medium or a network.

The residual information may include a residual coding syntax described below. The encoding apparatus may transform/quantize the residual samples to derive quantized transform coefficients. The residual information may include information on the quantized transform coefficients.

Meanwhile, as described above, the image encoding apparatus may generate a reconstructed picture (including reconstructed samples and a reconstructed block). To this end, the encoding apparatus may perform dequantization/inverse transform with respect to the quantized transform coefficients again to derive (modified) residual samples. The residual samples are transformed/quantized and then dequantized/inversely transformed, in order to derive the same residual samples as the residual samples derived in the decoding apparatus as described above. The image encoding apparatus may generate a reconstructed block including the reconstructed samples for the current block based on the prediction samples and the (modified) residual samples. A reconstructed picture for the current picture may be generated based on the reconstructed block. As described above, an in-loop filtering procedure is further applicable to the reconstructed picture.

FIG. 8 is a flowchart illustrating an intra prediction based video/image decoding method.

The image decoding apparatus may perform operation corresponding to operation performed by the image encoding apparatus.

The decoding method of FIG. 8 may be performed by the image decoding apparatus of FIG. 3. S810 to S830 may be performed by the intra predictor 265 of the decoding apparatus, and the prediction information of S810 and the residual information of S840 may be obtained from the bitstream by the entropy decoder 210 of the decoding apparatus. The residual processor of the image decoding apparatus may derive the residual samples for the current block based on the residual information (S840). Specifically, the dequantizer 220 of the residual processor may perform dequantization based on quantized transform coefficients derived based on the residual information to derive transform coefficients, and the dequantizer 230 of the residual processor may perform inverse transform with respect to the transform coefficients to derive the residual samples for the current block. Step S850 may be performed by the adder 235 or the reconstructor of the decoding apparatus.

Specifically, the image decoding apparatus may derive a intra prediction mode/type for the current block based on the received prediction information (intra prediction mode/type information) (S810). The image decoding apparatus may derive neighboring reference samples of the current block (S820). The image decoding apparatus may generate prediction samples in the current blocks based on the intra prediction mode/type and the neighboring reference samples (S830). In this case, the image decoding apparatus may perform a prediction sample filtering procedure. Predictive sample filtering may be referred to as post filtering. Some or all of the prediction samples may be filtered by the prediction sample filtering procedure. In some cases, the prediction sample filtering procedure may be omitted.

The image decoding apparatus generates residual samples for the current block based on the received residual information (S840). The image decoding apparatus may generate reconstructed samples for the current block based on the prediction samples and the residual samples, and derive a reconstructed block including the reconstructed samples (S850). A reconstructed picture for the current picture may be generated based on the reconstructed block. As described above, the in-loop filtering procedure is further applicable to the reconstructed picture.

FIG. 9 is a view illustrating a configuration of the intra predictor 265 according to the present disclosure.

As shown in FIG. 9, the intra predictor (intra prediction unit) 265 of the image decoding apparatus may include an intra prediction mode/type determination unit 266, a reference sample derivation unit 267 and a prediction sample derivation unit 268, the intra prediction mode/type determination unit 266 may determine the intra prediction mode/type for the current block based on the intra prediction mode/type information obtained by the intra prediction mode/type determination unit 186 of the image encoding apparatus, the reference sample derivation unit 266 may derive the neighboring reference samples of the current block, and the prediction sample derivation unit 268 may derive the prediction samples of the current block. Meanwhile, although not shown, when the above-described prediction sample filtering procedure is performed, the intra predictor 265 may further include a prediction sample filter (not shown).

The intra prediction mode information may include flag information (e.g., intra_luma_mpm_flag) specifying whether a most probable mode (MPM) or a remaining mode applies to the current block, and, when the MP IM applies to the current block, the intra prediction mode information may further include index information (e.g., intra_luma_mpr_idx) specifying one of intra prediction mode candidates (MPM candidates). The intra prediction mode candidates (MPM candidates) may be configured as an MPM candidate list or an MPM list. In addition, when the MPM does not apply to the current block, the intra prediction mode information may further include remaining mode information (e.g., intra_luma_mpm_remainder) specifying one of the remaining intra prediction modes excluding the intra prediction mode candidates (MPM candidates). The decoding apparatus may determine the intra prediction mode of the current block based on the intra prediction mode information.

In addition, the intra prediction technique information may be implemented in various forms. For example, the intra prediction technique information may include intra prediction technique index information specifying one of the intra prediction techniques. As another example, the intra prediction technique information may include at least one of reference sample line information (e.g., intra_luma_ref_idx)) specifying whether the MRL applies to the current block and which reference sample line is used if applied, ISP flag information (e.g. intra_subpartitions_mode_flag) specifying whether the ISP applies to the current block, ISP type information (e.g., intra_subpartitions_split_flag) specifying the split type of subpartitions when the ISP applies, flag information specifying whether PDPC applies or flag information specifying whether LIP applies. In the present disclosure, the ISP flag information may be referred to as an ISP application indicator.

The intra prediction mode information and/or the intra prediction type information may be encoded/decoded through the coding method described in the present disclosure. For example, the intra prediction mode information and/or the intra prediction type information may be encoded/decoded through entropy coding (e.g., CABAC or CAVLC) based on truncated (rice) binary code.

Hereinafter, an intra prediction mode/type determination method according to the present disclosure will be described in greater detail.

When intra prediction is applied to the current block, an intra prediction mode applied to the current block may be determined using intra prediction modes of neighboring blocks. For example, the image decoding apparatus may construct a most probable mode (mpm) list derived based on an intra prediction mode and additional candidate modes of neighboring blocks (eg., left and/or upper neighboring blocks) of the current block, and select one of mpm candidates in the mpm list based on the received mpm index. Alternatively, the image decoding apparatus may select one of the remaining intra prediction modes not included in the mpm list based on the remaining intra prediction mode information. For example, whether the intra prediction mode applied to the current block is in the mpm candidates (that is, is included in the mpm list) or is in the remaining mode may be indicated based on an mpm flag (e.g., intra_luma_mpm_flag). A value of 1 of the mpm flag may indicate that the intra prediction mode for the current block is in the mpm candidates (mpm list), and a value of 0 of the mpm flag may indicate that the intra prediction mode for the current block is not in mpm candidates (mpm list). The mpm index may be signaled in the form of an mpm_idx or intra_luma_mpm_idx syntax element, and the remaining intra prediction mode information may be signaled in the form of a rem_intra_luma_pred_mode or intra_luma_mpm_remainder syntax element. For example, the remaining intra prediction mode information may indicate one of the remaining intra prediction modes not included in the mpm candidates (mpm list), which are indexed in order of prediction mode numbers, among all intra prediction modes. The intra prediction mode may be an intra prediction mode for a luma component (sample). Hereinafter, the intra prediction mode information may include at least one of the mpm flag (e.g., intra_luma_mpm_flag), the mpm index (e.g., mpm_idx or intra_luma_mpm_idx), or the remaining intra prediction mode information (rem_intra_luma_pred_mode or intra_luma_mpm_remainder). In the present disclosure, the MPM list may be called various terms such as an MPM candidate list and candModeList.

FIG. 10 is a flowchart illustrating an intra prediction mode signaling procedure in an image encoding apparatus.

Referring to FIG. 10 the image encoding apparatus may configure an MPM list for a current block (S1010). The MPM list may include candidate intra prediction modes (MPM candidates) that are highly likely to be applied to the current block. The MPM list may include intra prediction modes of neighboring blocks or may further include specific intra prediction modes according to a predetermined method.

The image encoding apparatus may determine an intra prediction mode of the current block (S1020). The image encoding apparatus may perform prediction based on various intra prediction modes, and may determine an optimal intra prediction mode by performing rate-distortion optimization (RDO) based on the prediction. In this case, the image encoding apparatus may determine the optimal intra prediction mode using only the MPM candidates included in the MPM list, or may determine the optimal intra prediction mode using the remaining intra prediction modes as well as the MPM candidates included in the MPM list. Specifically, for example, if the intra prediction type of the current block is a specific type (e.g., LIP, MRL, or ISP) rather than a normal intra prediction type, the image encoding apparatus may determine the optimal intra prediction mode using only the MPM candidates. That is, in this case, the intra prediction mode for the current block may be determined only from among the MPM candidates, and in this case, the mpm flag may not be encoded/signaled. In the case of the specific type, the image decoding apparatus may estimate that the mpm flag is 1 without separately receiving the mpm flag.

Meanwhile, in general, when the intra prediction mode of the current block is one of MPM candidates in the MPM list, the image encoding apparatus may generate an mpm index indicating one of the MPM candidates. If the intra prediction mode of the current block is not included in the MPM list, remaining intra prediction mode information indicating the same mode as the intra prediction mode of the current block among remaining intra prediction modes not included in the MPM list may be generated.

The image encoding apparatus may encode the intra prediction mode information and output it in the form of a bitstream (S1030). The intra prediction mode information may include the aforementioned mpm flag, mpm index, and/or remaining intra prediction mode information. In general, the mpm index and the remaining intra prediction mode information have an alternative relationship and are not signaled simultaneously in indicating an intra prediction mode for one block. That is, the mpm index may be signaled when the mpm flag value is 1, and the remaining intra prediction mode information may be signaled when the mpm flag value is 0. However, as described above, when a specific intra prediction type is applied to the current block, the mpm flag is not signaled and its value is inferred to be 1, and only the mpm index may be signaled. That is, in this case, the intra prediction mode information may include only the mpm index.

Although, in the example shown in FIG. 10, S1020 is shown to be performed after S1010, this is an example, and S1020 may be performed before or simultaneously with S1010.

Figure 11:
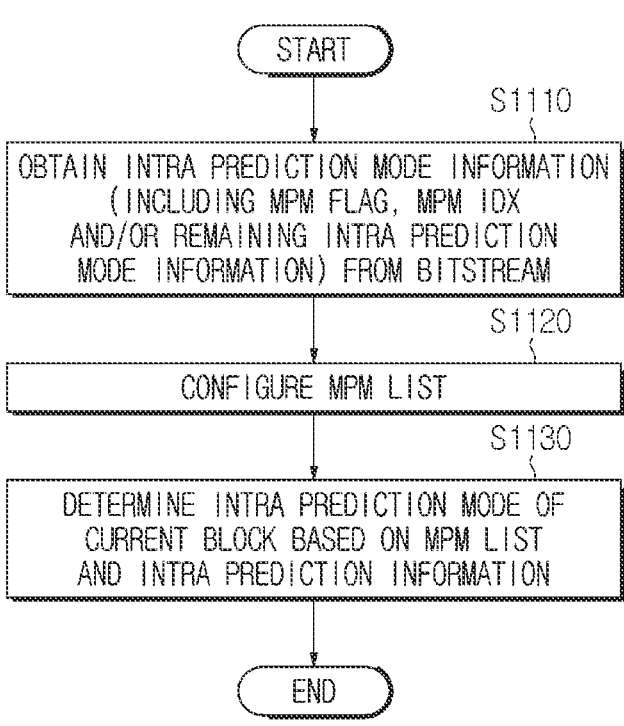
FIG. 11 is a flowchart illustrating an intra prediction mode determination procedure in an image decoding apparatus.

FIG. 11 is a flowchart illustrating an intra prediction mode determination procedure in an image decoding apparatus.

The image decoding apparatus may determine the intra prediction mode of the current block based on the intra prediction mode information determined and signaled by the image encoding apparatus.

Referring to FIG. 11, the image decoding apparatus may obtain intra prediction mode information from a bitstream (S1110). As described above, the intra prediction mode information may include at least one of an mpm flag, an mpm index, or a remaining intra prediction mode.

The image decoding apparatus may configure an MPM list (S1120). The MPM list is configure identically to the MPM list configured in the image encoding apparatus. That is, the MPM list may include intra prediction modes of neighboring blocks or may further include specific intra prediction modes according to a predetermined method.

Although, in the example shown in FIG. 11, S1120 is shown to be performed after S1110, this is an example, and S1120 may be performed before or simultaneously with S1110.

The image decoding apparatus determines an intra prediction mode of a current block based on the MPM list and the intra prediction mode information (S1130). Step S1130 will be described in more detail with reference to FIG. 12.

FIG. 12 is a flowchart illustrating an intra prediction mode derivation procedure in greater detail.

Steps S1210 and S1220 of FIG. 12 may correspond to steps S1110 and S1120 of FIG. 11, respectively. Therefore, detailed descriptions of steps S1210 and S1220 will be omitted.

The image decoding apparatus may obtain intra prediction mode information from a bitstream, configure an MPM list (S1210 and S1220), and determine a predetermined condition (S1230). Specifically, as shown in FIG. 12, when the value of the mpm flag is 1 (Yes in S1230), the image decoding apparatus nay derive a candidate indicated by the mpm index among MPM candidates in the MPM list as an intra prediction mode of the current block (S1240). As another example, when the value of the mpm flag is 0 (No in S1230), the image decoding apparatus may derive the intra prediction mode indicated by the remaining intra prediction mode information among the remaining intra prediction modes not included in the MPM list as the intra prediction mode of the current block (S1250). Meanwhile, as another example, when the intra prediction type of the current block is a specific type (e.g., LIP, MRL, or ISP) (Yes in S1230), the image decoding apparatus may derive a candidate indicated by the mpm index in the MPM list as the intra prediction mode of the current block without checking the mpm flag (S1240).

Meanwhile, when intra prediction is performed on the current block, prediction on the luma component block (luma block) and prediction on the chroma component block (chroma block) of the current block may be performed. In this case, the intra prediction mode for the chroma component may be set separately from the intra prediction mode for the luma component (luma block).

Figure 13:
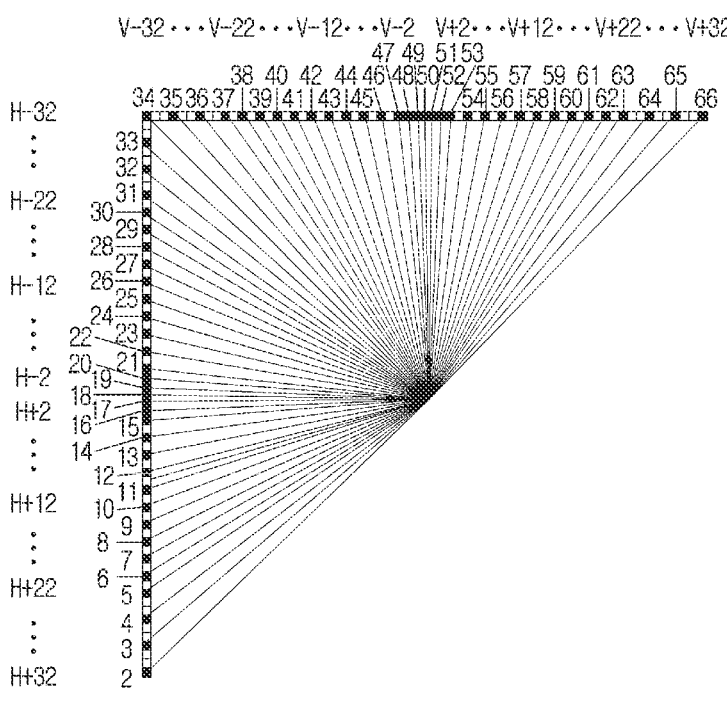
FIG. 13 is a view illustrating an intra prediction direction according to an embodiment of the present disclosure.

For example, the intra prediction mode for the chroma component may be indicated based on intra chroma prediction mode information, and the intra chroma prediction mode information may be signaled in the form of an intra_chroma_pred_mode syntax element. As an example, the intra chroma prediction mode information may indicate one of candidate modes including at least one of a planar mode, a DC mode, a vertical mode, a horizontal mode, a derived mode (DM), L_CCLM, T_CCLM, or LT_CCLM modes. DM may also be called direct mode, CCLM may be called LM, CCLM may be called LM, FIG. 13 is a view illustrating an intra prediction direction according to an embodiment of the present disclosure.

An intra prediction mode may include two non-directional intra prediction modes and 33 directional intra prediction modes. The non-directional intra prediction modes may include a planar mode and a DC mode, and the directional intra prediction modes may include intra prediction modes #2 to #34. The planar intra prediction mode may be called a planar mode and the DC intra prediction mode may be called a DC mode.

Figure 14:
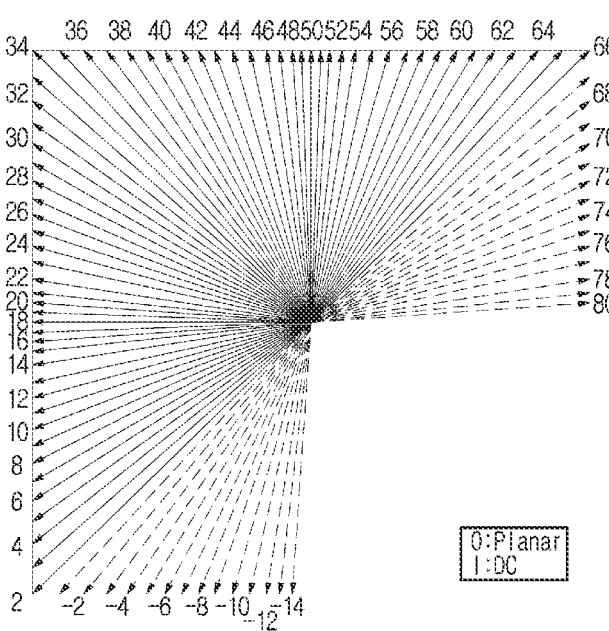
FIG. 14 is a view illustrating an intra prediction direction according to another embodiment of the present disclosure.

Alternatively, in order to capture any edge direction presented in natural video, as shown in FIG. 14, the intra prediction mode may include two non-directional intra prediction modes and 65 extended directional intra prediction modes. The non-directional intra prediction modes may include a planar prediction mode and a DC prediction mode, and the directional intra prediction modes may include intra prediction modes #2 to #66. The extended intra prediction mode is applicable to blocks having all sizes and to both a luma component (luma block) and a chroma component (chroma block).

Alternatively, the intra prediction mode may include two non-directional intra prediction modes and 129 directional intra prediction modes. The non-directional intra prediction modes may include a planar prediction mode and a DC prediction mode, and the directional intra prediction modes may include intra prediction modes #2 to #130.

Meanwhile, the intra prediction mode may further include a cross-component linear model (CCLM) mode for chroma samples in addition to the above-described intra prediction modes. The CCL mode may be split into L_CCLM, T_CCLM, LT_CCLM according to whether left samples, top samples or both thereof is considered for LM parameter derivation and may apply only to a chroma component.

The intra prediction mode may be indexed, for example, as shown in Table 2 below.

TABLE 2

| Intra prediction mode | Associated name |
|---|---|
| 0 | INTRA_PLANAR |
| 1 | INTRA_DC |
| 2 . . . 66 | INTRA_ANGULAR2 . . . INTRA_ANGULAR66 |
| 81 . . . 83 | INTRA_LT_CCLM, INTRA_L_CCLM, INTRA_T_CCLM |

FIG. 14 is a view illustrating an intra prediction direction according to another embodiment of the present disclosure. In FIG. 14, a dotted-line direction shows a wide-angle mode applying only to a non-square block. As shown in FIG. 14, in order to capture any edge direction presented in natural video, the intra prediction mode according to an embodiment may include two non-directional intra prediction modes and 93 directional intra prediction modes. The non-directional intra prediction modes may include a planar prediction mode and a DC prediction mode, and the directional intra prediction modes may include intra prediction modes #2 to #80 to #-1 to #-14, as denoted by arrow of FIG. 15. The planar mode may be denoted by INTRA_PLANAR, and the DC mode may be denoted by INTRA_DC. In addition, the directional intra prediction mode may be denoted by INTRA_ANGULAR-14 to INTRA_ANGU-LAR-1 and INTRA_ANGULAR2 to INTRA_ANGU-LAR80.

Meanwhile, the MPM list may be configured to include N MPMs. In this case, N may be 5 or 6.

In order to construct the MPM list, three types of modes described below may be considered.

Default intra modes

Neighbour intra modes

Derived intra modes

For the above neighbor intra modes, two neighboring blocks may be considered: a left neighboring block (A) and a top neighboring block (B).

In addition, the following initialized default MPM may be considered to configure the MPM list.

Default6MPM modes{A,Planar(0) or DC(1),Vertical (50),HOR(18),VER−4(46),VER+4(54)}

An MPM list may be configured by performing a pruning process on the two neighbor intra modes. If the two neighbor intra modes are equal to each other and the neighbor intra mode is greater than a DC (1) mode, the MPM list may include {A, Planar, DC}modes and include 3 derived intra modes. The three derived intra modes may be obtained by adding a predetermined offset value to the neighbor intra modes and/or performing a modulo operation. When the two neighbor intra modes are different from each other, the two neighbor intra modes are assigned to a first MPM mode and a second MPM mode, and the remaining four MPM modes may be derived from default modes and/or neighbor intra modes. In the process of generating the MPM list, a pruning process may be performed to prevent the same mode from overlap in the MPM list. Truncated Binary Code (TBC) may be used for entropy encoding of modes other than the MPM mode.

Figure 15:
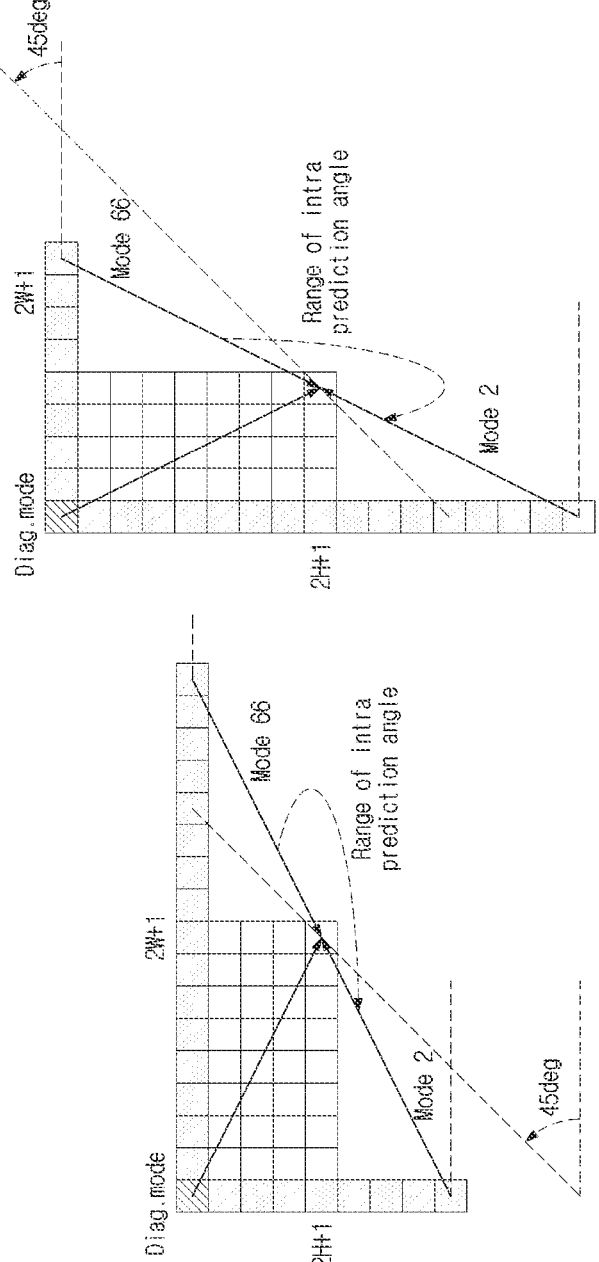
FIG. 15 is a view illustrating a reference sample for a wide-angle intra prediction node according to an embodiment of the present disclosure.

FIG. 15 is a view illustrating a reference sample for a wide-angle intra prediction mode according to an embodiment of the present disclosure.

As described above, the prediction direction of intra prediction may be defined as 45 degrees to −135 degrees in a clockwise direction. However, if a current block is a non-square block, some existing directional intra prediction modes may be adaptively replaced by a wide-angle intra prediction mode. When alternative wide-angle intra prediction is applied, information about existing intra prediction may be signaled, and after the information is parsed, the information may be remapped to the index of the wide-angle intra prediction mode. Accordingly, the total number of intra prediction modes for a specific block (e.g., anon-square block with a specific size) may not change, that is, the total number of intra prediction modes is 67, and intra prediction mode coding for the specific block may not change.

As shown in FIG. 15, upper reference samples with a length of 2 W+1 and left reference samples with a length of 2H+1 may be defined to support the wide-angle prediction direction. Meanwhile, when wide-angle intra prediction is applied, intra prediction modes replaced by the wide-angle intra prediction mode may differ depending on the aspect ratio of the current block. Intra prediction modes replaced by the wide-angle intra prediction mode according to the aspect ratio may be derived as shown in the following table.

TABLE 3

| Aspect ratio | Replaced intra prediction modes |
|---|---|
| W/H == 16 | Modes 12, 13, 14, 15 |
| W/H == 8 | Modes 12, 13 |
| W/H == 4 | Modes 2, 3, 4, 5, 6, 7, 8, 9, 10, 11 |
| W/H == 2 | Modes 2, 3, 4, 5, 6, 7, |
| W/H == 1 | None |
| W/H == 1/2 | Modes 61, 62, 63, 64, 65, 66 |
| W/H == 1/4 | Mode 57, 58, 59, 60, 61, 62, 63, 64, 65, 66 |
| W/H == 1/8 | Modes 55, 56 |
| W/H == 1/16 | Modes 53, 54, 55, 56 |

Figure 16:
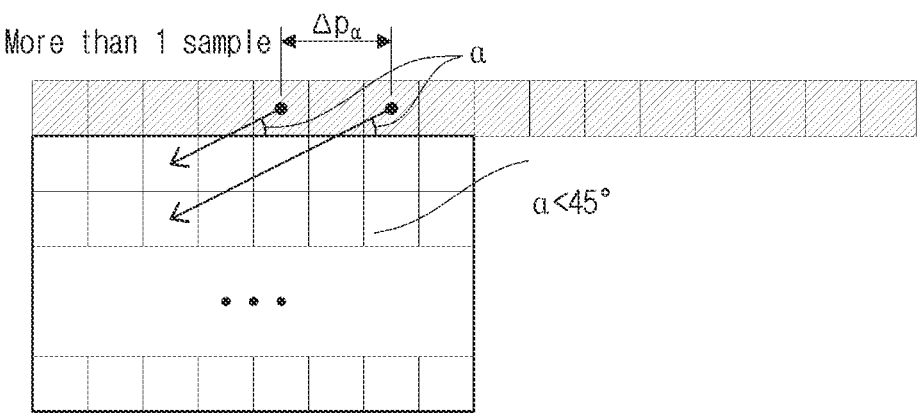
FIG. 16 is a view illustrating some wide-angle intra prediction directions according to an embodiment of the present disclosure.

FIG. 16 is a view illustrating some wide-angle intra prediction directions according to an embodiment of the present disclosure.

Meanwhile, when wide-angle intra prediction exceeding 45 degrees is performed as shown in FIG. 16, two vertically adjacent prediction samples may be predicted based on two non-adjacent reference samples. Therefore, a low-pass reference samples filter and side smoothing may be applied to wide-angle prediction to reduce the negative effects of increased gap Δpα.

Meanwhile, there may be cases where the wide-angle mode exhibits a non-fractional offset. Wide-angle modes that satisfy this condition may include a mode of [−14, −12, −10, −6, 72, 76, 78, 80].

As an example, if a block is predicted in wide-angle mode as above, samples in a reference buffer may be copied directly without applying any interpolation. Therefore, the number of samples required for smoothing may be reduced. In addition, in the existing prediction mode and wide-angle mode, non-fractional modes may be designed.

Overview of Neighboring Reference Sample Derivation

When intra prediction applies to a current block, neighboring reference samples to be used for intra prediction of a current block may be derived. The neighboring reference samples of the current block may include a sample adjacent to a left boundary of the current block having a size of nW×nH and a total of 2×nH samples neighboring a bottom-left, a sample adjacent to a top boundary of the current block and a total of 2×nW samples neighboring a top-right, and one sample neighboring a top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to a right boundary of the current block having a size of nW×nH, a total of nW samples adjacent to a bottom boundary of the current block and one sample neighboring a bottom-right of the current block.

Meanwhile, when MRL is applied, the reference samples may be located on a different line, for example, lines 1 to 3, rather than line 0 adjacent to the current block on the left/top, in which case the number of neighboring reference samples may increase further. The area and number of specific neighboring reference samples will be described later.

Meanwhile, when ISP described later is applied, the neighboring reference samples may be derived on a subpartition basis.

Meanwhile, an interpolation filter may be applied to derive extended intra reference samples. Some of the neighboring reference samples of the current block may not have been decoded yet or may not be available. In this case, the decoder may configure neighboring reference samples to be used for prediction through interpolation of available samples.

Meanwhile, extrapolation nay be applied to derive extended intra reference samples. Some of the neighboring reference samples of the current block may not have been decoded yet or may not be available. In this case, the decoder may configure neighboring reference samples to be used for prediction through extrapolation of available samples. They may be configured by substituting or padding a pixel which has not yet been decoded or is not available with a last available sample while updating a referenceable sample to a latest sample (last available sample), starting from the bottom-left until reaching the top-right reference sample.

Overview of Reference Sample Filtering

Meanwhile, filtering may be applied to neighboring reference samples of the current block. This may be called pre filtering in that it is applied to neighboring reference samples before intra prediction, unlike post filtering, which is filtering applied to prediction samples after intra prediction. Filtering for the neighboring reference samples may be called smoothing filtering, and may be performed, for example, as in the following equation.

the filtered sample values p[x][y] with x=−1, y=−1 . . . refH−1 and x=0 . . . refW−1, y=−1 are derived as follows:

$$p[-1][-1]=(\text{refUnfilt}[-1][0]+2*\text{refUnfilt}[-1][-1]+\text{refUnfilt}[0][-1]+2)\gg2 \qquad (1.3.4\text{-}1)$$

$$p[-1][y]=(\text{refUnfilt}[-1][y+1]+2*\text{refUnfilt}[-1][y]+\text{refUnfilt}[-1][y-1]+2)\gg2$$

$$\text{for } y=0 \ldots \text{refH}-2 \qquad (1.3.4\text{-}2)$$

$$p[-1][\text{refH}-1]=\text{refUnfilt}[-1][\text{refH}-1] \qquad (1.3.4\text{-}3)$$

$$p[x][-1]=(\text{refUnfilt}[x-1][-1]+2*\text{refUnfilt}[x][-1]+\text{refUnfilt}[x+1][-1]+2)\gg2$$

$$\text{for } x=0 \ldots \text{refW}-2 \qquad (1.3.4\text{-}4)$$

$$p[\text{refW}-1][-1]=\text{refUnfilt}[\text{refW}-1][-1] \qquad (1.3.4\text{-}5)$$

Here, refUnfilt represents neighboring reference samples that have not yet been filtered, and [x][y] represents the x,y coordinates of the sample. For example, this may represent the coordinates when the top-left sample position coordinates of the current block are (0,0).

If filtering is applied to the neighboring reference samples, the filtered neighboring reference samples may be used as reference samples in the prediction sample derivation step, and if filtering is not applied to the neighboring reference samples, the unfiltered neighboring reference samples may be used as reference samples in the prediction sample derivation step.

Filtering of neighboring reference samples as described above may be applied, for example, when some or all of the following specific conditions are satisfied.

nTbW*nTbH is greater than 32
cIdx is equal to 0
IntraSubPartitionsSplitType is equal to ISP_NO_SPLIT
one or more of the following conditions is true:
predModeIntra is equal to INTRA_PLANAR
predModeIntra is equal to INTRA_ANGULAR34
predModeIntra is equal to INTRA_ANGULAR2 and nTbH is greater than or equal to nTbW
predModeIntra is equal to INTRA_ANGULAR66 and nTbW is greater than or equal to nTbH As an example, procedures such as intra prediction mode/type determination, neighboring reference sample derivation, and prediction sample derivation may all be performed on a CU basis. As another example, intra prediction mode/ type determination is performed on a CU basis, but neighboring reference sample derivation and prediction sample derivation procedures may be performed on a TU basis within the CU. In this case, TUs within the CU may share the same intra prediction mode/type. Therefore, considering this case, whether to filter the neighboring reference samples may be determined by considering nTbW and nTbH, which are the width and height of the TU (or TB).

The prediction unit of the encoding apparatus/decoding apparatus may derive a reference sample according to the intra prediction mode of the current block among the neighboring reference samples of the current block, and may generate a prediction sample of the current block based on the reference sample.

For example, a prediction sample may be derived based on the average or interpolation of neighboring reference samples of the current block, and (ii) for a prediction sample of the neighboring reference samples of the current block, the prediction sample may be derived based on based on a reference sample present in a specific (prediction) direction. (i) may be called a non-directional mode or non-angular mode, and (ii) may be called a directional mode or angular mode. In addition, through interpolation between the second neighboring sample and the first neighboring sample located in the opposite direction of the prediction direction of the intra prediction mode of the current block based on the prediction sample of the current block among the neighboring reference samples, the prediction sample may be generated. The above-described case may be called linear interpolation intra prediction (LIP). In addition, a temporary prediction sample of the current block is derived based on filtered neighboring reference samples, and the prediction sample of the current block may be derived by a weighted sum of at least one reference sample derived according to the intra prediction mode among the existing neighboring reference samples, that is, unfiltered neighboring reference samples, and the temporary prediction sample. The above-described case may be called PDPC (Position dependent intra prediction). In addition, a reference sample line with the highest prediction accuracy is selected from among the neighboring multiple reference sample lines of the current block to derive a prediction sample using the reference sample located in the prediction direction from that line, and at this time, intra prediction encoding may be performed by indicating (signaling) the used reference sample line to the decoding apparatus. The above-described case may be called multi-reference line intra prediction (MRL) or MRL-based intra prediction. In addition, intra prediction may be performed based on the sane intra prediction mode by partitioning the current block into vertical or horizontal subpartitions, and neighboring reference samples may be derived and used in units of subpartitions. That is, in this case, the intra prediction mode for the current block is equally applied to the subpartitions, but intra prediction performance can be improved in some cases by deriving and using neighboring reference samples in units of subpartitions. This prediction method may be called intra subpartitions (ISP) or ISP-based intra prediction. Specific details will be described later. In addition, when the prediction direction based on the prediction sample points between neighboring reference samples, that is, when the prediction direction points to a fractional sample position, the value of the prediction sample may be derived through interpolation of a plurality of reference samples located around in the prediction direction (around the fractional sample position).

The above-described intra prediction methods may be called an intra prediction type, distinguishing them from the intra prediction mode in FIG. 13 and/or FIG. 14. The intra prediction type may be called various terms such as intra prediction technique or additional intra prediction mode. For example, the intra prediction type (or additional intra prediction mode, etc.) may include at least one of the above-described LIP, PDPC, MRL, or ISP. The information about the intra prediction type may be encoded in an encoding apparatus, included in a bitstream, and signaled to a decoding apparatus. The information about the intra prediction type may be implemented in various forms, such as flag information indicating whether each intra prediction type is applied or index information indicating one of several intra prediction types.

The MPM list for deriving the above-described intra prediction mode may be configured differently depending on the intra prediction type. Alternatively, the MPM list may be commonly configured regardless of the intra prediction type.

Meanwhile, when the prediction sample of the current block is generated through interpolation of reference samples, an interpolation filter for interpolation may be derived through various methods. For example, the interpolation filter may be determined based on a predetermined condition. For example, the interpolation filter may be determined based on the intra prediction mode for the current block and/or the size of the current block. The interpolation filter may include, for example, a Gaussian filter and a cubic filter. As an example, if the intra prediction mode for the current block is a lower left diagonal intra prediction mode (#2), an upper left diagonal intra prediction mode (#34), or an upper right diagonal intra prediction mode (#66), it may be determined that the interpolation filter is not applied or that a Gaussian filter rather than a cubic filter is applied. In addition, for example, if the reference line index of the MRL is 0, the cubic filter may be applied, and if the reference line index is greater than 0, it may be determined that the interpolation filter is not applied or the Gaussian filter is applied. In addition, in the intra prediction mode, if the prediction direction according to the intra prediction mode based on the position of the current prediction sample points to a fractional sample point rather than an integer sample point of neighboring reference samples, the interpolation filter may be applied to generate a reference sample value corresponding to the fractional sample point.

Meanwhile, in a 6-tap interpolation filter of an enhanced compression model, 4-tap cubic interpolation may be replaced by a 6-tap cubic interpolation filter to derive a predicted sample from a reference sample. For reference sample filtering, a 6-tap Gaussian filter is applied to a larger block (W>=32 and H>=32), and otherwise an existing VVC 4-tap Gaussian interpolation filter may be applied. An extended intra reference sample may be derived using a 4-tap interpolation filter instead of nearest neighbor rounding.

Meanwhile, if the prediction direction according to the intra prediction mode based on the position of the current prediction sample (target prediction sample) in the current block points to a fractional sample point rather than an integer sample point of neighboring reference samples, the interpolation filter may, be applied to generate a reference sample value corresponding to the fractional sample point.

Meanwhile, after performing intra prediction, a filter that relaxes a block boundary may be applied to reduce the error between the prediction samples of the current block and the already reconstructed neighboring samples. For example, this filter may determine whether to apply the filter and the type of filter depending on the predicted mode and block size.

Meanwhile, in decoder side intra mode derivation (DIMD), intra prediction may be derived by a weighted average between two derived direction and planar. Two angle modes may be selected from the Histogram of Gradient (HoG) calculated from adjacent pixels of the current block. When two modes are selected, the predictor of the mode and planar predictor are calculated, and then the weighted average may be used as a final predictor for the block. The corresponding amplitude of HoG may be used for each of the two modes to determine the weight.

Since the derived intra mode may be included in the primary list of intra MPM (Most Probable Mode), the DIMD process may be performed before the MPM list is constructed. The primacy derived intra mode of a DIMD block is stored with the block and may be used to construct the MPM list of neighboring blocks.

Overview of Combined Inter and Intra Prediction (CIIP)

Figure 17:
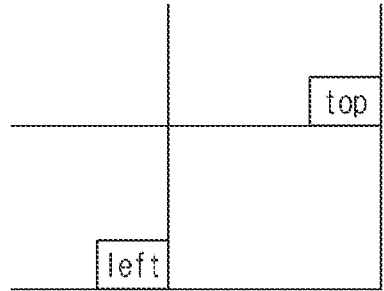
FIG. 17 is a view showing neighboring blocks that may be used in CIP (Combined Inter and Intra Prediction).

Meanwhile, intra prediction may be combined with inter prediction and applied to the current block, which is called CIIP (Combined Inter and Intra Prediction) mode. FIG. 17 is a view showing neighboring blocks that may be used in CIIP (Combined Inter and Intra Prediction). An additional flag (e.g., ciip_flag) may be signaled to indicate whether the Combined Inter/Intra Prediction (CIIP) mode is applied to the current block (e.g., CU). For example, when the current block is coded in a merge mode, the block contains at least 64 luma samples (i.e., block width*block height is greater than or equal to 64), and if the block width and/or the block height is less than 128 luma samples, an additional flag may be signaled to indicate whether the Combined Inter/Intra Prediction (CIP) mode is applied to the current block. CIIP prediction may combine inter and intra prediction signals, and the inter prediction signal in CIIP mode P_inter may be derived using the same inter prediction process applied to the normal merge mode. The intra prediction signal P_intra may be derived according to an intra prediction process using planar mode. Then, the intra and inter prediction signals may be combined using a weighted average, where the weight may be calculated according to the coding mode of the top and left neighboring blocks, as shown in FIG. 17.

As an example, if the top neighboring block is available and intra-coded, isIntraTop may be set to 1, and otherwise isIntraTop may be set to 0.

As another example, if the left neighboring block is available and intra-coded, isIntraLeft may be set to 1, and otherwise isIntraLeft may be set to 0.

As another example, if (isIntraLeft+isIntraLeft) is 2, wt may be set to 3.

Otherwise, if (isIntraLeft+isIntraLeft) is 1, wt may be set to 2.

In other cases, wt may be set to 1.

Meanwhile, CIIP prediction may be derived by the following equation.

$$P_{CIIP} = ((4 - wt) * P_{inter} + wt * P_{intra} + 2) >> 2$$

As an example, $P_{CIIP}$ on the left may represent a CIIP signal, $P_{inter}$ may represent an inter prediction signal, and P_intra may represent an intra prediction signal.

MRL (Multi-Reference Line) Intra Prediction

Figure 18:
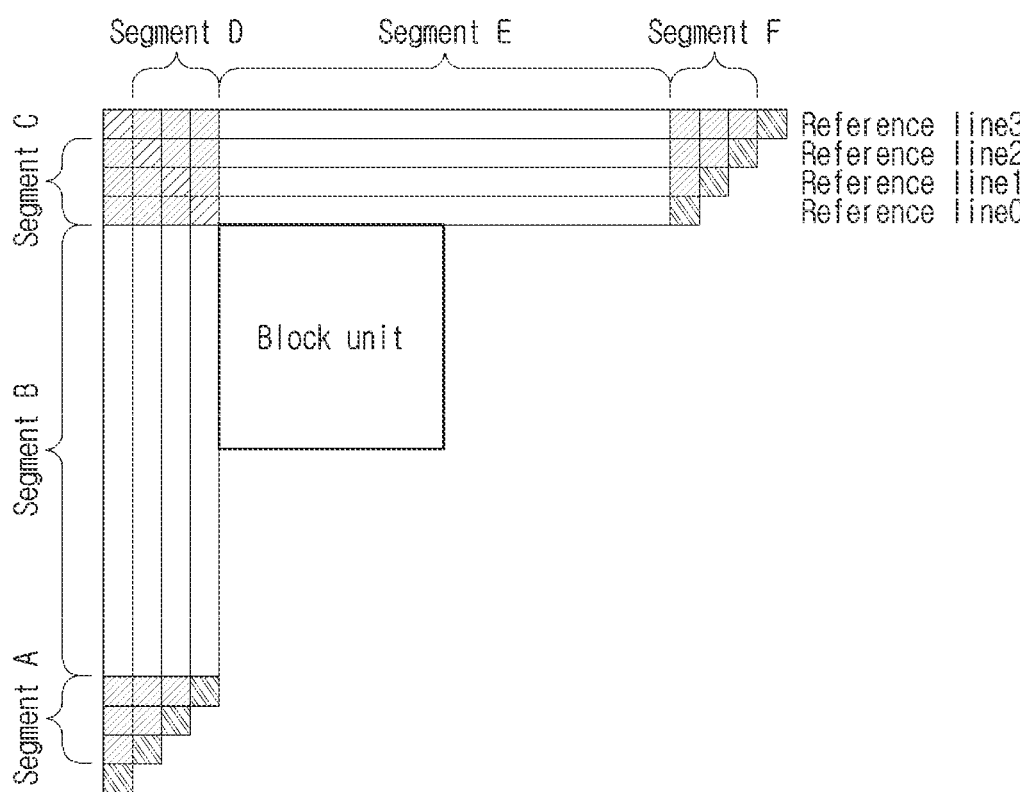
FIG. 18 is a view illustrating MRL intra prediction.

In the conventional intra prediction, only the neighboring samples of the top first line and the left first line of the current block were used as reference samples for intra prediction. However, in the multiple-reference line (MRL) method, intra prediction may be performed using neighboring samples located on a sample line separated by one to three samples from the upper and/or left side of the current block as reference samples. FIG. 18 is a view illustrating MRL intra prediction and is a view showing an example of a multiple-reference line. Here, the multiple-reference line index (ex. mrl_idx) indicates which line is used for intra prediction for the current block. For example, the multiple-reference line index may be signaled through coding unit syntax as follows. The multiple-reference line index may be configured in the form of an intra_luma_ref_idx syntax element.

TABLE 4 coding_unit( x0, y0, cbWidth, cbHeight, treeType ) {
if( slice_type != I ) {
cu_skip_flag[ x0 ][ y0 ]
if( cu_skip_flag[ x0 ][ y0 ] = = 0 )
pred_mode_flag
}
if( CuPredMode[ x0 ][ y0 ] == MODE_INTRA ) {
if( treeType = = SINGLE_TREE || treeType = = DUAL_TREE_LUMA
) {
if( ( y0 % CtbSizeY ) > 0 )
intra_luma_ref_idx[ x0 ][ y0 ] ...
if (intra_luma_ref_idx[ x0 ][ y0 ] = = 0)
intra_luma_mpm_flag[ x0 ][ y0 ]
if( intra_luma_mpm_flag[ x0 ][ y0 ] )
intra_luma_mpm_idx[ x0 ][ y0 ]
Else
intra_luma_mpm_remainder[ x0 ][ y0 ]
}
...
} intra_luma_ref_idx[x0][y0] may specify the intra reference line index IntraLumaRefLineIdx[x0][y0] as specified in Table 5 below. If intra_luma_ref_idx[x0][y0] does not exist, it may be considered equal to 0.

intra_luma_ref_idx may be called (intra) reference sample line index or mrl_idx. In addition, intra_luma_ref_idx may also be called intra_luma_ref_line_idx.

TABLE 5

| intra_luma_ref_idx[ x0 ][ y0 ] | IntraLumaRefLineIdx[ x0 ][ y0 ] |
|---|---|
| 0 | 0 |
| 1 | 1 |
| 2 | 3 |

If intra_luma_mpm_flag[x0][y0] does not exist, it may be considered equal to 1.

MRL may be disabled for blocks on the first line (row) within the CTU. This is to prevent extended reference lines outside the current CTU line from being used. In addition, PDPC may be disabled when the above-described additional reference line is used.

Intra Sub-Partitions (ISP) Prediction

Figure 19A:
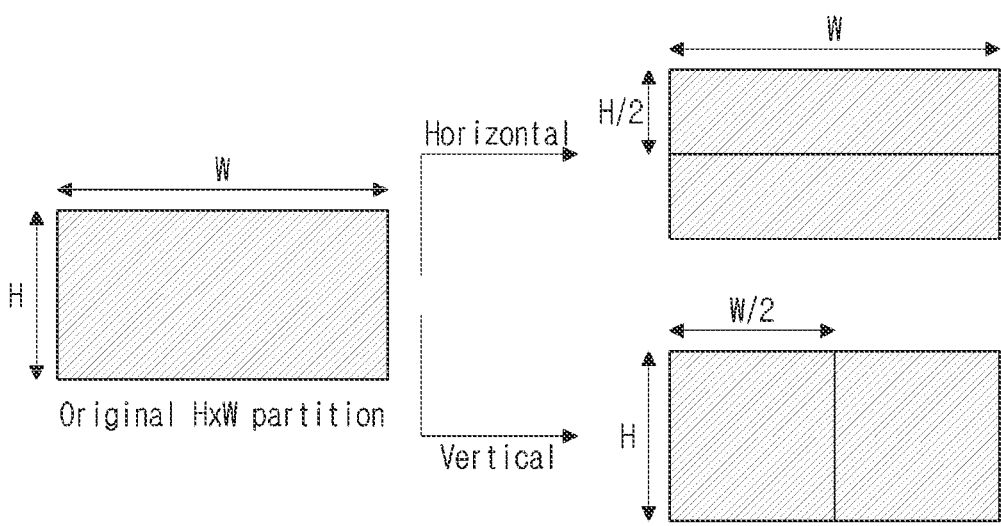
FIGS. 19A and 19B are views illustrating intra subpartitions (ISP).
Figure 19B:
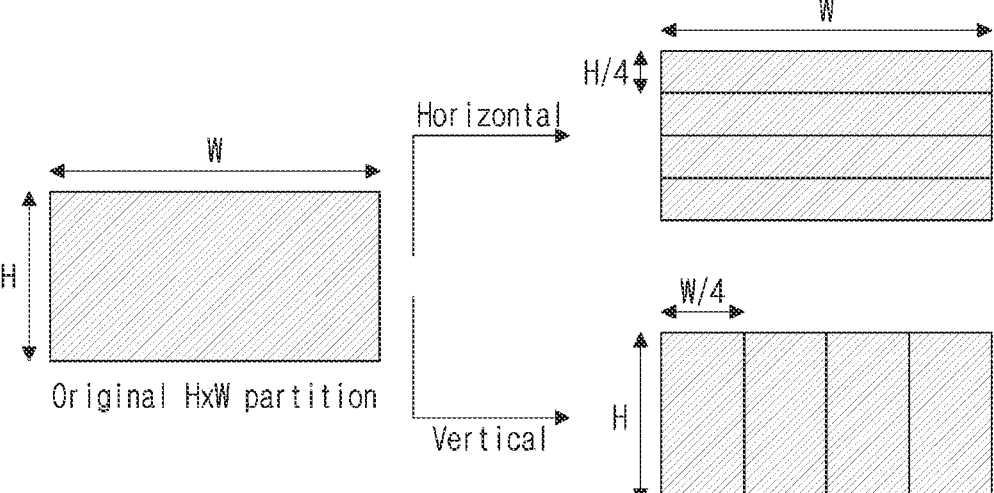

In conventional intra prediction, a block to be currently encoded was considered as one coding unit and coding was performed without splitting. However, the Intra Sub-Partitions (ISP) prediction method splits the block currently to be encoded in the horizontal or vertical direction and performs intra prediction encoding. FIGS. 19A and 19B are views for explaining an Intra Sub-Partitions (ISP) process according to the present disclosure. At this time, encoding/decoding is performed on a partitioned block basis to generate a reconstructed block, and the reconstructed block is used as a reference block for a next partitioned block. Currently, in Intra Sub-Partitions (ISP), splitting is performed according to block size as shown in Table 5.

TABLE 6

| Block size (CU) | Number of splits |
|---|---|
| 4 × 4 | not available |
| 4 × 8, 8 × 4 | 2 |
| In all other cases | 4 |

More specifically, FIG. 19A is a view for explaining a partition example of 4×8 and 8×4 blocks (C U), and FIG. 19B is a view for explaining a partition example of all blocks except 4×8, 8×4, and 4×4 blocks (CU).

TABLE 7

| Block Size | Coefficient group Size |
|---|---|
| 1 × N, N ≥ 16 | 1 × 16 |
| N × 1, N ≥ 16 | 16 × 1 |
| 2 × N, N ≥ 8 | 2 × 8 |
| N × 2, N ≥ 8 | 8 × 2 |
| All other possible M × N cases | 4 × 4 |

In order to reduce coding complexity, the intra subpartition method generates an MPM list according to each partition method (horizontal partition and vertical partition) and compares an appropriate prediction mode of prediction modes in the generated MPM list from a rate distortion optimization (RDO) perspective to generate an optimal mode. In addition, if multiple-reference line (MRL) intra prediction is used, the intra subpartition method described above cannot be used. That is, the intra subpartition method is applied only when the 0-th reference line is used (i.e., intra_luma_ref_idx value 0). In addition, when the above-described intra subpartition method is used, the above-described PDPC cannot be used.

The intra subpartition method first transmits whether intra subpartition is applied or not in block units, and if the current block uses an intra subpartition (intra_subpartitions_mode_flag), information about whether it is horizontal or vertical split (intra_subpartitions_split_flag) is encoded/decoded again.

When the intra subpartition method is applied, the intra prediction mode for the current block is equally applied to the subpartitions, and intra prediction performance can be improved by deriving and using neighboring reference samples on a subpartition basis. That is, when the intra subpartition method is applied, the residual sample processing procedure is performed on a subpartition basis. In other words, intra prediction samples are derived for each subpartition, and the residual signal (residual samples) for the corresponding subpartition is added to obtain reconstructed samples. The residual signal (residual samples) may be derived through a dequantization/inverse transform procedure based on residual information (quantized transform coefficient information or residual coding syntax) in the bitstream described above. That is, prediction samples and residual samples for a first subpartition are derived, and based on this, reconstructed samples for the first subpartition may be derived. In this case, when deriving prediction samples for a second subpartition, some of the reconstructed samples in the first subpartition (e.g., left or top neighboring reference samples of the second subpartition) may be used as neighboring reference samples for the second subpartition. Similarly, prediction samples and residual samples for the second subpartition are derived, and based on this, reconstructed samples for the second subpartition may be derived. In this case, when deriving prediction samples for a third subpartition, some of the reconstructed samples in the second subpartition (e.g., left or top neighboring reference samples of the third subpartition) may be used as neighboring reference samples for the third subpartition. The same applies below.

In intra prediction, reference sample filtering may be applied when a reference line index is 0, that is, when MRL (multi reference line)-based intra prediction is not applied and the number of pixels in the block is 32 or more, when the color component of the current block is a luma color component, when ISP (Intra subpartitions) are not applied, and when the intra prediction mode is any one of 0, –14, –12, –10, –6, 2, 34, 66, 72, 76, 78, 80.

That is, current intra reference sample filtering may not be applied to blocks with a certain size or less. For example, it is not applied to blocks such as 4×4, 4×8, and 8×4, and reference sample filtering may not be applied even if the intra prediction mode of the current block is MRL or ISP is applied. In addition, when the intra prediction mode is a planar mode or a specific directional mode, for example, intra reference sample filtering may be applied only to an integer direction mode or a specific wide-angle direction mode, and somewhat restrictive application conditions are presented. In addition, as proposed in an ECM (enhanced compression model) for future codec standardization, a 6-tap cubic filter or a 6-tap Gaussian filter may be applied as described above and thus the effect of existing intra reference sample filtering is greatly reduced.

Accordingly, the present disclosure proposes a method of applying intra reference sample filtering more elaborately or simply. According to an embodiment of the present disclosure, a filter applied to intra reference sample filtering nay be adaptively selected as one of a plurality of filters. For example, a filter may be selected based on specific conditions, including the size of the current block or the number of reference samples. In addition, according to another embodiment of the present disclosure, intra reference sample filtering may be applied only in a specific intra prediction mode, and reference sample filtering may be performed when generating an intra prediction pixel. Meanwhile, according to another embodiment of the present disclosure, intra reference sample filtering may or may not always be applied regardless of other conditions including intra prediction mode.

Embodiment 1

In the present embodiment, a method of applying filtering more precisely is proposed by diversifying a filter applicable to reference sample filtering. More specifically, in the present embodiment, one or more filters used for reference sample filtering are proposed, where the filters may have different filter coefficients, or the number of filter coefficients, i.e., the number of taps, may be different, and the filter coefficients may all be positive.

Hereinafter, for clarity of explanation, each filter is referred to as an n-th filter, such as a first filter or a second filter, but the order or type of filters is not limited. In addition, for clarity of explanation, only the first filter and the second filter are used in the following description, but it does not necessarily mean that only two filters exist, and more various filters may exist and thus the present disclosure is not limited thereto.

As an example, filters that may be used for reference sample filtering may include a 3-tap filter as a first filter. For example, a 3-tap filter may be a [1, 2, 1] filter. In addition, an n-tap filter, not n=3, may be included as a second filter. For example, n may be 5 or 6. Alternatively, n may be an odd integer. When n is 6, the filter coefficient of the 6-tap filter may be [1, 4, 6, 4, 1, 0]. As another example, when n is 5, the filter coefficient of the 5-tap filter may be [1, 4, 6, 4, 1]. As an example, the second filter is a Gaussian filter and may be applied to integer sample positions. That is, it may be an n-tap Gaussian filter.

As an example, if the 5-tap filter is [1, 4, 6, 4, 1], it may be applied as follows.

$$\text{ref\_filtered}[x]=(\text{ref}[x{-}2]+4^*\text{ref}[x{-}1]+6^*\text{ref}[x]+4^*\text{ref}[x{+}1]+\text{ref}[x{+}2])/16$$

In the above equation, ref[x] refers to a reference sample at the x position to which reference sample filtering is currently applied, and ref_filtered[x] may refer to a pixel to which reference sample filtering is applied. In other words, encoding and decoding efficiency can be increased by adaptively applying a more sophisticated [1, 4, 6, 4, 1] smoothing filter instead of a 3-tap filter (e.g., [1, 2, 1] smoothing filter).

Meanwhile, when selecting one of a plurality of filters, a first filter (e.g., [1, 2, 1] filter) and a second filter (e.g., [1, 4, 6, 4]) are adaptively applied depending on the number of reference samples, further improving reference sample filtering efficiency.

As an example, intra reference sample filtering may always be performed using the second filter. That is, if the first filter is a 3-tap filter, intra reference sample filtering may be performed using a filter other than the first filter. Assuming that the other filter used at this time is a second filter, the second filter may be an n-tap filter with n>3. As an example, if the second filter is a [1, 4, 6, 4, 1] filter, the second filter may always be applied.

As another example, when performing reference sample filtering, a filter may be selected considering the size or area of a block. For example, if the width and/or height of a current block is greater than or equal to a certain value (e.g., 32 or 16), one filter may be used, and otherwise a different filter may be used. At this time, for reference sample filtering of the current block whose size or area is greater than or equal to the certain value, an arbitrary k-tap filter may be selected, and in other cases, an arbitrary j-tap filter may be selected, where k>j. In other words, the size of the block may be a selection criterion for the filter. For example, if the width and/or height of the current block is greater than or equal to a certain value, a 5-tap filter (e.g. [1, 4, 6, 4, 1]) may be applied, and otherwise a 3-tap filter (e.g., [1, 2, 1]) may be applied. As another example, if the size or area of the block (e.g., a value by multiplying width by block height) is greater than a certain value (e.g., 1024 or 256), a 5-tap filter (e.g., [1, 4, 6, 4, 1]) may be applied, and otherwise a 3-tap filter (e.g., [1, 2, 1]) may be applied.

According to the present embodiment, filtering performance can be improved by adaptively selecting a filter and performing reference sample filtering.

Meanwhile, reference sample filtering application conditions may include conditions for whether ISP/MRL is applied, the color component of the current block, or the intra prediction mode, as described above, but may also follow the changed reference sample filtering application conditions. Meanwhile, in the changed reference sample filtering application conditions, some of the above-mentioned conditions may be added or changed, and some conditions may be excluded. The changed reference sample filtering application conditions will be described in detail below.

Embodiment 2

In the present embodiment, a method of simplifying reference sample filtering application conditions is proposed. Table 8 below shows the performance when reference sample filtering is not applied using a [1, 2, 1] filter as an example.

TABLE 8

| | All Intra Main10 Over VTM-10.0 CTC | | | | |
|---|---|---|---|---|---|
| | Y | U | V | EncT | DecT |
| Class A1 | 0.11% | 0.07% | 0.02% | 106% | 101% |
| Class A2 | 0.03% | −0.01% | −0.07% | 106% | 101% |
| Class B | 0.05% | 0.07% | 0.00% | 107% | 102% |
| Class C | −0.02% | −0.01% | −0.02% | 106% | 100% |
| Class E | −0.03% | −0.26% | −0.27% | 106% | 99% |
| Overall | 0.03% | −0.02% | −0.06% | 106% | 101% |
| Class D | 0.00% | −0.11% | 0.13% | 106% | 101% |
| Class F | −0.03% | −0.01% | −0.27% | 103% | 101% |

The above experimental results show performance in all intra predictions. As shown in the table above, the performance of intra [1, 2, 1] reference sample filtering is 0.03% for the Y component.

Meanwhile, when the reference sample filtering conditions are changed and reference sample filtering is applied only in a specific intra mode (for example, planar intra mode), performance improvement of 0.02% occurs for the Y component. In other words, considering the previous experimental results described above, performance improvement can be expected even when intra reference sample filtering is applied in a specific intra mode.

Therefore, in the present embodiment, a method of applying reference sample filtering only in a specific intra mode (for example, planar intra mode) is proposed as follows.

As an example, intra reference sample filtering is applicable when a reference line index is 0 (i.e., MRL is not applied), when the number of pixels in the current block is 32 or more, when the color component of the current block is a luma color component, when ISP is not applied to the current block, and when an intra prediction mode index is 0, that is, when an intra direction is 0 (planar intra mode).

Meanwhile, among the application conditions described above, the conditions excluding the last condition, that is, when the intra direction is 0, may be removed or added to improve encoding performance and reduce complexity.

For example, in order to obtain higher encoding performance, a condition for applying reference sample filtering may be applied regardless of the size of the block. For example, when the reference line index is 0 (when MRL is not applied), when the color component of the current block is a luma color component, when ISP is not applied to the current block, and when the intra direction is planar intra mode, reference sample filtering may be applied.

As another example, to obtain higher encoding performance, a condition for applying reference sample filtering may be applied regardless of the color component of the block. For example, when the reference line index is 0 (MRL is not applied), when the number of pixels in the current block is 32 or more, when ISP is not applied to the current block, and when the intra direction is planar intra mode, reference sample filtering may be applied.

As another example, in order to obtain higher coding performance, conditions for applying reference sample filtering may be applied by considering whether or not the above-described DIMD and/or CIIP are applied. Whether to perform reference sample filtering may be determined based on whether planar intra prediction is performed in the above-described DIMD and CIIP. For example, when the reference line index is 0 (MRL is not applied), when the number of pixels in the current block is 32 or more, when ISP is not applied to the current block, when DIMD is not applied, and when the intra direction is planar intra mode, reference sample filtering may be applied. As another example, when the reference line index is 0 (MRL is not applied), when the number of pixels in the current block is 32 or more, when ISP is not applied to the current block, when CIIP is not applied, and when the intra direction is planar intra mode, reference sample filtering may be applied. Alternatively, reference sample filtering may be applied only when neither DIMD or CIIP are not applied.

As another example, contrary to the above example, reference sample filtering may be applied only when CIIP is applied to the current block, when DIMD is applied, or when CIIP or DIMD is applied. As an example, the intra prediction mode at this time may be planar intra prediction.

As another example, when an intra predictor (e.g. planar intra predictor) such as CIP or DIMD is combined with other intra/inter prediction, whether or not to apply reference sample filtering may be determined in intra prediction.

Meanwhile, as an example, when reference sample filtering is applied only in planar intra mode, a method of integrating the reference sample filtering process with intra planar prediction is proposed. That is, reference sample filtering does not exist as a separate process, and reference sample filtering may be an internal process of planar prediction. FIGS. 20 and 21 show examples of two specifications in which a reference sample filtering process is added to planar prediction. As an example, in the planar intra prediction mode, a reference sample width and reference sample height may be input and used for reference sample filtering.

Meanwhile, when reference sample filtering is applied only in the planar intra mode, only a single filter may be used, but a plurality of filters may be adaptively applied as in Embodiment 1. For example, when adaptively applying a first filter (e.g., [1, 2, 1] filter) and a second filter (e.g., [1, 4, 6, 4, 1] filter), the first filter (e.g., [1, 2, 1] filter) may always be applied or the second filter (e.g., [1, 4, 6, 4, 1] filter) may always be applied, if the block width and/or height is greater than or equal to a certain value (e.g., 32 or 16), the second filter is applied, and otherwise, the first filter is applied, or when the size or area of the block (e.g., block width*block height) is greater than or equal to a certain value (for example, 1024 or 256), the second filter may be applied, and otherwise, the first filter may be applied.

According to the above embodiment, the performance of reference sample filtering can be improved, and thus the encoding and decoding efficiency can be improved.

Embodiment 3

In the present embodiment, another method of simplifying reference sample filtering application conditions is proposed.

As an example, as described above, regardless of the intra prediction mode, the color component of the current block, or whether ISP/MRL is applied, when intra prediction is applied to the current block, reference sample filtering may always be applied.

As another example, as described above, regardless of the intra prediction mode, the color component of the current block, or whether ISP/MRL is applied, when intra prediction is applied to the current block, reference sample filtering may not always be applied.

Meanwhile, as an example, when reference sample filtering is always applied, the reference sample filter is a single filter (e.g., [1, 2, 1] filter), or in addition to the single filter, a plurality of filters proposed above may be further considered. For example, a first filter (e.g., [1, 2, 1] filter) and a second filter (e.g., [1, 4, 6, 4, 1] filter) may be considered. Meanwhile, even if the reference sample filtering itself is performed regardless of any conditions, when one of the plurality of filters is adaptively selected and applied, other conditions such as the size of the current block mentioned above, the intra prediction mode, etc. may be considered.

When always applying or not applying reference sample filtering, it is unnecessary to check conditions such as block size conditions, whether ISP/MRL is used, and intra prediction direction conditions. In other words, regardless of the above-described conditions, reference sample filtering may always be performed when intra prediction is applied. Accordingly, the overhead related to the complexity of the overall intra prediction algorithm and whether reference sample filtering is applied is reduced, which can have the effect of increasing the efficiency and speed of image encoding/decoding.

Figure 22:
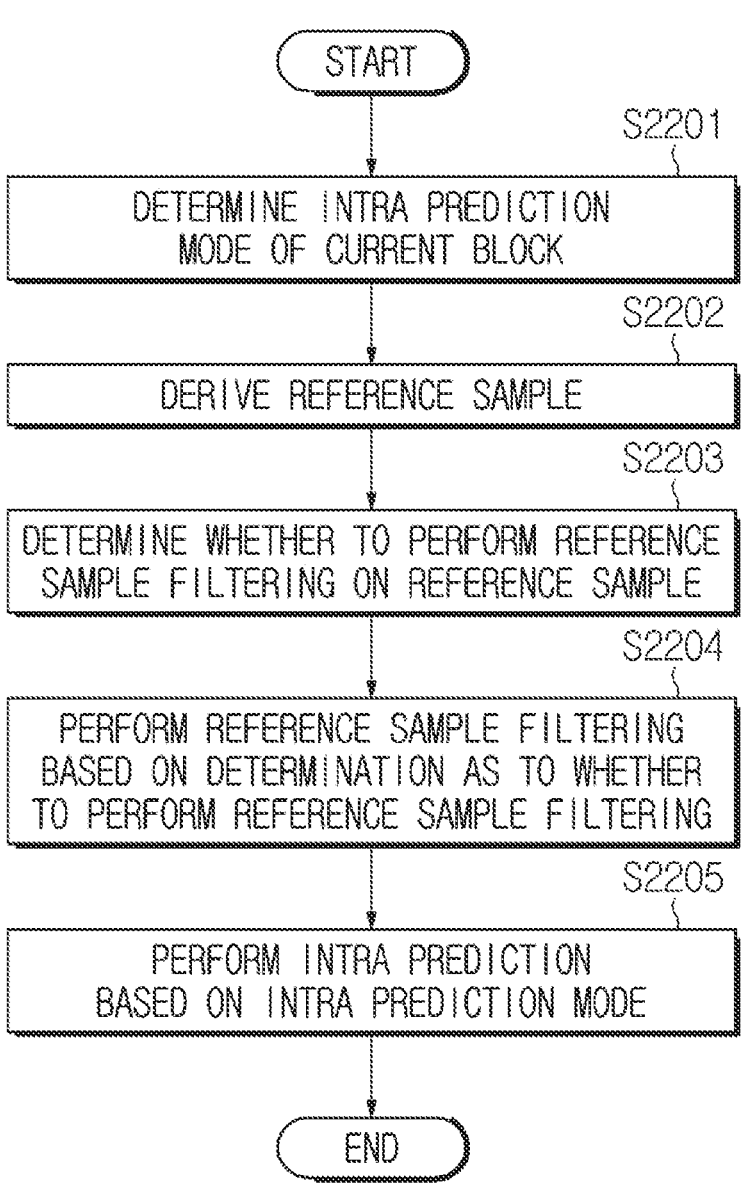
FIG. 22 is a view illustrating an image encoding or decoding process of performing reference sample filtering based on an intra prediction mode according to an embodiment of the present disclosure.

FIG. 22 is a view illustrating an image encoding or decoding process of performing reference sample filtering based on an intra prediction mode according to an embodiment of the present disclosure. As an example, FIG. 22 may be performed by an image encoding apparatus or an image decoding apparatus.

As an example, when an image encoding or decoding apparatus performs image encoding or decoding, an intra prediction mode of a current block may, be determined (S2201). The intra prediction mode may be determined based on information for determining the intra prediction mode, may be obtained from a bitstream, or may be derived based on other information. As an example, information for determining the intra prediction mode may include an MPM list index, etc., as described above.

Meanwhile, when the intra prediction mode is determined, a reference sample that may be used for intra prediction may be derived (S2202). As an example, the reference sample may be derived based on the determined intra prediction mode, and this derivation process may be included in the process in which intra prediction is performed. More specifically, in the embodiment of FIG. 22, it is expressed as a separate step for clarity of explanation, but the process of deriving the reference sample (S2202), determining whether to perform reference sample filtering on the derived reference sample (S2203), and/or performing reference sample filtering based on the determination as to whether to perform reference sample filtering (S2204) may be implemented in a way that is included in the process of performing intra prediction (S2205), but the present disclosure is not limited to thereto.

For example, if the determined intra prediction mode is a specific intra prediction mode (e.g., planar intra prediction mode), the process of performing intra prediction (S2205) may include the process of performing reference sample filtering (S2204). That is, reference sample filtering may be included in the intra prediction process itself based on the specific intra prediction mode. Meanwhile, as an example, the reference sample filtering (S2204) may or may not be applied regardless of other conditions (e.g., intra prediction direction, block size, etc.) as long as intra prediction is applied to the current block. That is, in some cases, the process of determining whether to perform reference sample filtering (S2203) on the reference sample may be omitted. On the other hand, if the process (S2203) is not omitted and whether to perform reference sample filtering is determined (S2203), whether to perform reference sample filtering may be determined by information derived based on information signaled from the bitstream or other information and may be determined based on the reference sample filtering application conditions. For example, the conditions for reference sample filtering described in the above-described embodiment may be applied.

Meanwhile, when reference sample filtering (S2204) is applied, as an example, reference sample filtering may be performed by adaptively selecting one of a plurality of filters. In addition, the filter may be adaptively selected based on the number of intra prediction reference samples. The number of intra prediction reference samples may be determined based on the size of the current block. As an example, the number of intra prediction reference samples may be determined based on comparison of the size of the current block with a certain value, as described in the above embodiment. Meanwhile, one filter (e.g., a first filter) of the plurality of filters may be a 3-tap filter, and the 3-tap filter may be composed of [1, 2, 1]. In addition, another filter (e.g., a second filter) is an n-tap filter, and n may be a value greater than 3. For example, another filter may be a 5-tap filter or a 6-tap filter. As an example, the 5-tap filter may be [1, 4, 6, 4, 1], and the 6-tap filter may be [1, 4, 6, 4, 1, 0]. For example, all filter coefficients used for filtering may be positive numbers. Meanwhile, the reference sample filtering application conditions may include whether DIMD (decoder side intra mode derivation) is applied and/or CIIP (combined inter intra prediction) is applied. That is, whether to apply reference sample filtering may be determined based on whether decoder side intra mode derivation (DIMD) and/or combined inter intra prediction (CIIP) are applied. Meanwhile, reference sample filtering may be applied regardless of the color component of the current block and may be applied regardless of the size of the current block.

When intra prediction is performed based on the intra prediction mode (S2205), an intra prediction sample may be generated. A reconstructed sample for the current block may be obtained based on the generated intra prediction sample. As described above, the reconstructed samples may be generated based on a residual sample and a prediction sample.

In addition, since the image encoding and decoding method described with reference to FIG. 22 corresponds to an embodiment of the present disclosure, steps combining the embodiments described above may be added or the order of some steps may be changed or deleted.

For example, in the case of the image encoding method, a process of encoding a residual sample (i.e., residual signal) obtained based on the prediction sample and the current block into a bitstream may be further included, or a process of encoding information related to the intra prediction mode into a bitstream may be further included. In addition, a process of transmitting the bitstream to the image decoding apparatus, etc. may be further included.

Figure 23:
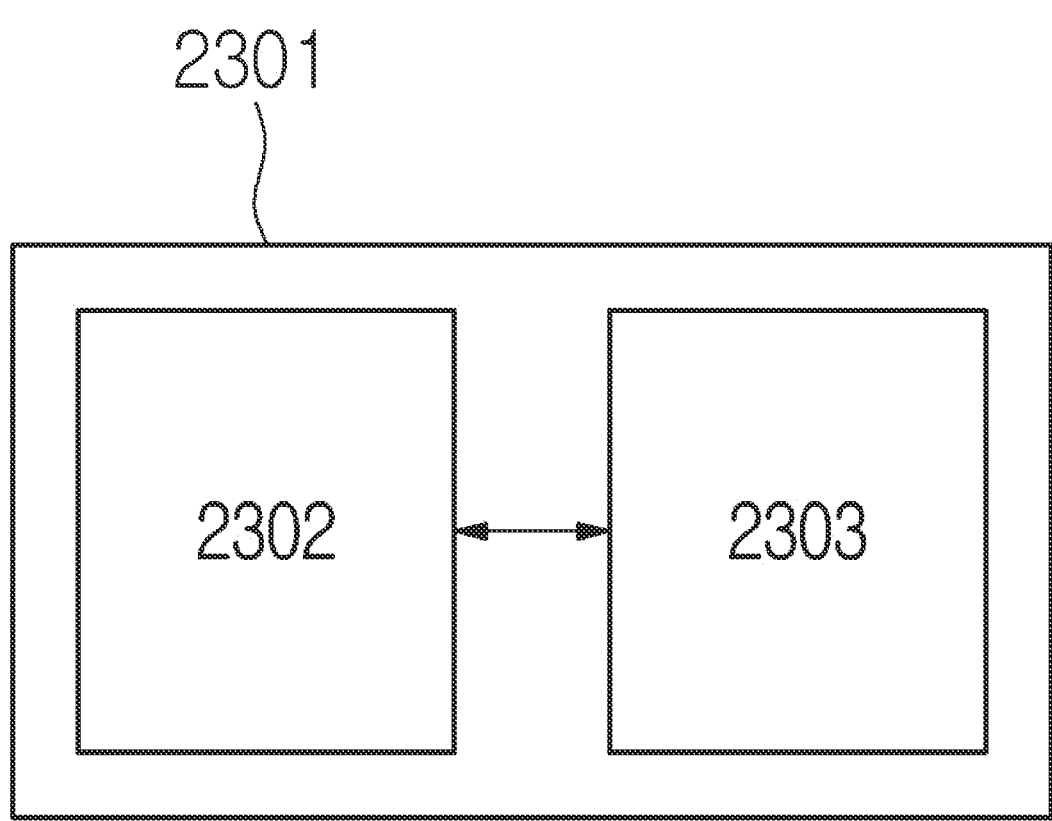
FIG. 23 is a view for explaining an image encoding/decoding apparatus according to an embodiment of the present disclosure.

FIG. 23 is a view for explaining an image encoding/decoding apparatus according to an embodiment of the present disclosure. As an example, the image encoding/decoding apparatus may include a memory 2302 and at least one processor 2303.

As an example, at least one processor performs the above-described embodiment and image encoding/decoding method, but some steps may be performed in parallel or, if possible, the order of some steps may be changed or some steps may be omitted.

As an example, at least one processor may determine an intra prediction mode of a current block, perform intra prediction based on the intra prediction mode, and obtain a reconstructed sample based on the prediction sample generated by the intra prediction.

As an example, at least one processor performs planar intra prediction based on the intra prediction mode being a planar prediction mode, and the planar intra prediction may include an intra prediction reference sample filtering process of the current block.

According to the present disclosure, the overhead of intra prediction reference sample filtering can be reduced and encoding and decoding efficiency can be improved, by changing or simplifying the conditions of intra prediction reference sample filtering.

Various embodiments according to the present disclosure may be used alone or in combination with other embodiments.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs) field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D)) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 24:
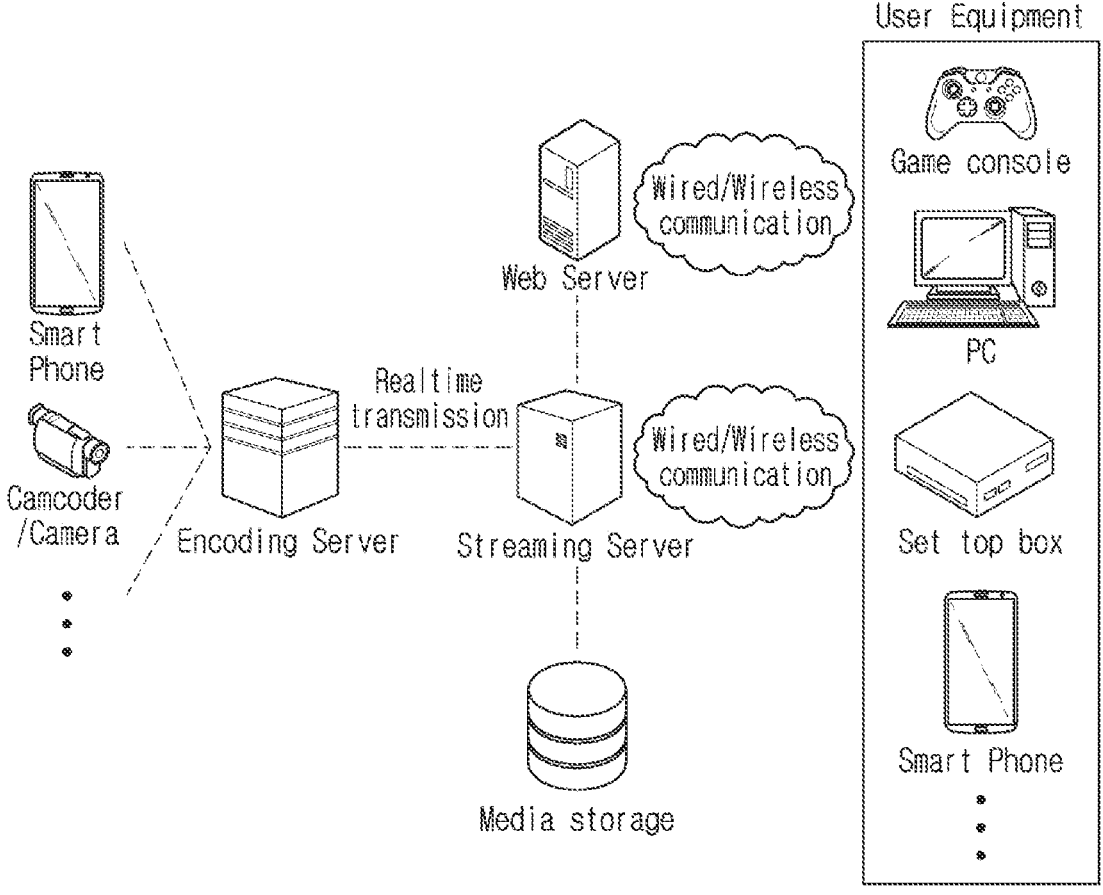
FIG. 24 is a view showing a content streaming system to which an embodiment of the present disclosure is applicable.

FIG. 24 is a view showing a content streaming system, to which an embodiment of the present disclosure is applicable.

As shown in FIG. 24, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g. an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:

determining an intra prediction mode of a current block;

performing planar intra prediction based on the intra prediction mode being a planar prediction mode; and obtaining a reconstructed sample of the current block based on a prediction sample obtained based on the planar intra prediction, wherein the performing the planar intra prediction comprises applying filtering to an intra prediction reference sample of the current block, wherein the filtering is applied to the intra prediction reference sample of the current block only based on the intra prediction mode of the current block being the planar prediction mode.

2. The image decoding method of claim 1, wherein the filtering is performed by adaptively selecting one from a plurality of filters including a first filter or a second filter.

3. The image decoding method of claim 2, wherein the selected one filter is selected based on the number of intra prediction reference samples.

4. The image decoding method of claim 3, wherein the number of intra prediction reference samples is determined based on a size of the current block.

5. The image decoding method of claim 4, wherein the number of intra prediction reference samples is determined based on comparison between the size of the current block and a certain value.

6. The image decoding method of claim 2, wherein the first filter is a 3-tap filter and the second filter is a 5-tap filter.

7. The image decoding method of claim 6, wherein the 3-tap filter is [1, 2, 1].

8. The image decoding method of claim 6, wherein the 5-tap filter is [1, 4, 6, 4, 1].

9. The image decoding method of claim 1, wherein the applying of the filtering is determined based on at least one of whether to apply decoder side intra mode derivation (DIMD) or whether to apply combined inter intra prediction (CIIP).

10. The image decoding method of claim 1, wherein the filtering is applied regardless of a size of the current block.

11. The image decoding method of claim 1, wherein the filtering is applied regardless of a color component of the current block.

12. The image decoding method of claim 1, wherein the filtering is performed based on a [1, 2, 1] filter, and is performed based on at least one of a size of the current block, a color component of the current block or whether to apply intra subpartition (ISP).

13. An image encoding method performed by an image encoding apparatus, the image encoding method comprising:

determining an intra prediction mode of a current block;

performing planar intra prediction based on the intra prediction mode being a planar prediction mode; and obtaining a reconstructed sample of the current block based on a prediction sample obtained from the planar intra prediction, wherein the performing the planar intra prediction comprises applying filtering to an intra prediction reference sample of the current block, wherein the filtering is applied to the intra prediction reference sample of the current block only based on the intra prediction mode of the current block being the planar prediction mode.

14. A method of transmitting a bitstream generated by an image encoding method, the image encoding method comprising:

determining an intra prediction mode of a current block;

performing planar intra prediction based on the intra prediction mode being a planar prediction mode; and obtaining a reconstructed sample of the current block based on a prediction sample obtained from the planar intra prediction, wherein the performing the planar intra prediction comprises applying filtering to an intra prediction reference sample of the current block, wherein the filtering is applied to the intra prediction reference sample of the current block only based on the intra prediction mode of the current block being the planar prediction mode.

* * * * *